(12) United States Patent
Abhyanker

(10) Patent No.: US 9,022,324 B1
(45) Date of Patent: May 5, 2015

(54) COORDINATION OF AERIAL VEHICLES THROUGH A CENTRAL SERVER

(71) Applicant: Raj Abhyanker, Cupertino, CA (US)

(72) Inventor: Raj Abhyanker, Cupertino, CA (US)

(73) Assignee: Fatdoor, Inc., Mountain View, CA (US)

( * ) Notice: Subject to any disclaimer, the term of this patent is extended or adjusted under 35 U.S.C. 154(b) by 0 days.

(21) Appl. No.: 14/269,219

(22) Filed: May 5, 2014

(51) Int. Cl.
*B64C 13/20* (2006.01)

(52) U.S. Cl.
CPC ........................ *B64C 13/20* (2013.01)

(58) Field of Classification Search
USPC ................................................ 244/189, 190
See application file for complete search history.

(56) References Cited

U.S. PATENT DOCUMENTS

| | | | |
|---|---|---|---|
| 2,035,218 | A | 3/1936 | Bloom |
| 3,253,806 | A | 5/1966 | Eickmann |
| 3,556,438 | A | 1/1971 | Meditz |
| 3,762,669 | A | 10/1973 | Curci |
| 4,119,163 | A | 10/1978 | Ball |
| 4,161,843 | A | 7/1979 | Hui |
| 4,375,354 | A | 3/1983 | Henriksson |
| 4,556,198 | A | 12/1985 | Tominaga |
| 4,779,203 | A | 10/1988 | McClure et al. |
| 4,914,605 | A | 4/1990 | Loughmiller, Jr. et al. |
| 4,996,468 | A | 2/1991 | Field et al. |
| 5,032,989 | A | 7/1991 | Tornetta |
| 5,050,844 | A | 9/1991 | Hawk |
| 5,199,686 | A | 4/1993 | Fletcher |
| 5,208,750 | A | 5/1993 | Kurami et al. |
| 5,325,294 | A | 6/1994 | Keene |
| 5,372,211 | A | 12/1994 | Wilcox et al. |
| 5,521,817 | A * | 5/1996 | Burdoin et al. .................... 701/3 |
| 5,577,567 | A | 11/1996 | Johnson et al. |
| 5,581,630 | A | 12/1996 | Bonneau, Jr. |
| 5,584,025 | A | 12/1996 | Keithley et al. |
| 5,590,062 | A | 12/1996 | Nagamitsu et al. |
| 5,617,319 | A | 4/1997 | Arakawa et al. |

(Continued)

FOREIGN PATENT DOCUMENTS

| | | |
|---|---|---|
| EP | 1426876 A1 | 6/2004 |
| KR | 101069834 B1 | 10/2010 |

(Continued)

OTHER PUBLICATIONS http://www.zdnet.com/news/perspective-social-networking-for-all/149441.

(Continued)

*Primary Examiner* — Brian M O'Hara
*Assistant Examiner* — Keith L Dixon
(74) *Attorney, Agent, or Firm* — Raj Abhyanker, P.C.

(57) ABSTRACT

A system and method of coordination of aerial vehicles through a central server are disclosed. In one embodiment, a system includes a central server and an Internet protocol network. A first aerial vehicle is communicatively coupled with the central server through the Internet protocol network and a second aerial vehicle is communicatively coupled with the first aerial vehicle when a command is transferred through the central server using the Internet protocol network. A first computing device of a first user of the first aerial vehicle operatively controls the first aerial vehicle and a second computing device of a second user of the second aerial vehicle operatively controls the second aerial vehicle. At least one of the first computing device of the first user and the second computing device of the second user communicate the command to the first aerial vehicle through the central server.

26 Claims, 12 Drawing Sheets

(56) References Cited

U.S. PATENT DOCUMENTS

| | | | |
|---|---|---|---|
| 5,630,103 A | 5/1997 | Smith et al. |
| 5,671,342 A | 9/1997 | Millier et al. |
| 5,720,363 A | 2/1998 | Kipp |
| 5,751,245 A | 5/1998 | Janky et al. |
| 5,774,133 A | 6/1998 | Neave et al. |
| 5,794,207 A | 8/1998 | Walker et al. |
| 5,805,810 A | 9/1998 | Maxwell |
| 5,819,269 A | 10/1998 | Uomini |
| 5,826,244 A | 10/1998 | Huberman |
| 5,831,664 A | 11/1998 | Wharton et al. |
| 5,835,896 A | 11/1998 | Fisher et al. |
| 5,852,810 A | 12/1998 | Sotiroff et al. |
| 5,904,214 A | 5/1999 | Lin |
| 5,905,499 A | 5/1999 | McDowall et al. |
| 5,907,322 A | 5/1999 | Kelly et al. |
| 5,926,765 A | 7/1999 | Sasaki |
| 5,930,474 A | 7/1999 | Dunworth et al. |
| 5,937,413 A | 8/1999 | Hyun et al. |
| 5,940,806 A | 8/1999 | Danial |
| 5,991,737 A | 11/1999 | Chen |
| 6,024,288 A | 2/2000 | Gottlich et al. |
| 6,029,141 A | 2/2000 | Bezos et al. |
| 6,029,195 A | 2/2000 | Herz |
| 6,034,618 A | 3/2000 | Tatebayashi et al. |
| 6,036,601 A | 3/2000 | Heckel |
| 6,047,194 A | 4/2000 | Andersson |
| 6,047,236 A | 4/2000 | Hancock et al. |
| 6,049,778 A | 4/2000 | Walker et al. |
| 6,059,263 A | 5/2000 | Otema et al. |
| 6,073,138 A | 6/2000 | de l'Etraz et al. |
| 6,078,906 A | 6/2000 | Huberman |
| 6,088,702 A | 7/2000 | Plantz et al. |
| 6,092,076 A | 7/2000 | McDonough et al. |
| 6,092,105 A | 7/2000 | Goldman |
| 6,101,484 A | 8/2000 | Halbert et al. |
| 6,108,639 A | 8/2000 | Walker et al. |
| 6,122,592 A | 9/2000 | Arakawa et al. |
| 6,134,486 A | 10/2000 | Kanayama |
| 6,148,260 A | 11/2000 | Musk et al. |
| 6,148,289 A | 11/2000 | Virdy |
| 6,175,831 B1 | 1/2001 | Weinreich et al. |
| 6,199,076 B1 | 3/2001 | Logan et al. |
| 6,229,533 B1 | 5/2001 | Farmer et al. |
| 6,236,990 B1 | 5/2001 | Geller et al. |
| 6,269,369 B1 | 7/2001 | Robertson |
| 6,308,177 B1 | 10/2001 | Israni et al. |
| 6,317,718 B1 | 11/2001 | Fano |
| 6,336,111 B1 | 1/2002 | Ashby et al. |
| 6,339,745 B1 | 1/2002 | Novik |
| 6,356,834 B2 | 3/2002 | Hancock et al. |
| 6,381,537 B1 | 4/2002 | Chenault et al. |
| 6,401,085 B1 | 6/2002 | Gershman et al. |
| 6,405,123 B1 | 6/2002 | Rennard et al. |
| 6,408,307 B1 | 6/2002 | Semple et al. |
| 6,445,983 B1 | 9/2002 | Dickson et al. |
| 6,453,339 B1 | 9/2002 | Schultz et al. |
| 6,470,268 B1 | 10/2002 | Ashcraft et al. |
| 6,480,885 B1 | 11/2002 | Olivier |
| 6,487,583 B1 | 11/2002 | Harvey et al. |
| 6,498,982 B2 | 12/2002 | Bellesfield et al. |
| 6,507,776 B1 * | 1/2003 | Fox, III ............... 701/11 |
| 6,513,069 B1 | 1/2003 | Abato et al. |
| 6,519,629 B2 | 2/2003 | Harvey et al. |
| 6,532,007 B1 | 3/2003 | Matsuda |
| 6,542,813 B1 | 4/2003 | Kovacs |
| 6,542,817 B2 | 4/2003 | Miyaki |
| 6,542,936 B1 | 4/2003 | Mayle et al. |
| 6,557,013 B1 | 4/2003 | Ziff et al. |
| 6,587,787 B1 | 7/2003 | Yokota |
| 6,597,983 B2 | 7/2003 | Hancock |
| 6,600,418 B2 | 7/2003 | Francis et al. |
| 6,611,751 B2 | 8/2003 | Warren |
| 6,615,039 B1 | 9/2003 | Eldering |
| 6,622,086 B2 | 9/2003 | Polidi |
| 6,629,136 B1 | 9/2003 | Naidoo |
| 6,633,311 B1 | 10/2003 | Douvikas et al. |
| 6,636,803 B1 | 10/2003 | Hartz, Jr. et al. |
| 6,640,187 B1 | 10/2003 | Chenault et al. |
| 6,643,663 B1 | 11/2003 | Dabney et al. |
| 6,646,568 B2 | 11/2003 | MacPhail et al. |
| 6,647,383 B1 | 11/2003 | August et al. |
| 6,654,800 B1 | 11/2003 | Rieger, III |
| 6,658,410 B1 | 12/2003 | Sakamaki et al. |
| 6,662,016 B1 | 12/2003 | Buckham et al. |
| 6,672,601 B1 | 1/2004 | Hofheins et al. |
| 6,677,894 B2 | 1/2004 | Sheynblat et al. |
| 6,684,196 B1 | 1/2004 | Mini et al. |
| 6,687,878 B1 | 2/2004 | Eintracht et al. |
| 6,691,105 B1 | 2/2004 | Virdy |
| 6,691,114 B1 | 2/2004 | Nakamura |
| 6,711,414 B1 | 3/2004 | Lightman et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,728,635 B2 | 4/2004 | Hamada et al. |
| 6,745,196 B1 | 6/2004 | Colyer et al. |
| 6,750,881 B1 | 6/2004 | Appelman |
| 6,798,407 B1 | 9/2004 | Benman |
| 6,816,850 B2 | 11/2004 | Culliss |
| 6,819,267 B1 | 11/2004 | Edmark et al. |
| 6,834,229 B2 | 12/2004 | Rafiah et al. |
| 6,847,823 B2 | 1/2005 | Lehikoinen et al. |
| 6,868,314 B1 | 3/2005 | Frink |
| 6,871,140 B1 | 3/2005 | Florance et al. |
| 6,882,307 B1 | 4/2005 | Gifford |
| 6,883,748 B2 | 4/2005 | Yoeli |
| 6,889,213 B1 | 5/2005 | Douvikas et al. |
| 6,907,405 B2 | 6/2005 | Brett |
| 6,918,576 B2 | 7/2005 | Finkbeiner |
| 6,926,233 B1 * | 8/2005 | Corcoran, III ............... 244/76 R |
| 6,931,419 B1 | 8/2005 | Lindquist |
| 6,950,791 B1 | 9/2005 | Bray et al. |
| 6,963,879 B2 | 11/2005 | Colver et al. |
| 6,968,179 B1 | 11/2005 | De Vries |
| 6,968,513 B1 | 11/2005 | Rinebold et al. |
| 6,974,123 B2 | 12/2005 | Latvys |
| 6,976,031 B1 | 12/2005 | Toupal et al. |
| 6,978,284 B2 | 12/2005 | McBrearty et al. |
| 6,983,139 B2 | 1/2006 | Dowling et al. |
| 6,987,976 B2 | 1/2006 | Kohar et al. |
| 7,006,881 B1 | 2/2006 | Hoffberg et al. |
| 7,013,292 B1 | 3/2006 | Hsu et al. |
| 7,024,397 B1 | 4/2006 | Donahue |
| 7,024,455 B2 | 4/2006 | Yokobori et al. |
| 7,038,681 B2 | 5/2006 | Scott et al. |
| 7,047,202 B2 | 5/2006 | Jaipuria et al. |
| 7,050,909 B2 | 5/2006 | Nichols et al. |
| 7,068,309 B2 | 6/2006 | Toyama et al. |
| 7,069,308 B2 | 6/2006 | Abrams |
| 7,072,849 B1 | 7/2006 | Filepp et al. |
| 7,076,409 B2 | 7/2006 | Agrawala et al. |
| 7,076,741 B2 | 7/2006 | Miyaki |
| 7,079,943 B2 | 7/2006 | Flann et al. |
| 7,080,019 B1 | 7/2006 | Hurzeler |
| 7,080,096 B1 | 7/2006 | Imamura |
| 7,085,650 B2 | 8/2006 | Anderson |
| 7,099,745 B2 * | 8/2006 | Ebert ............... 700/245 |
| 7,099,862 B2 | 8/2006 | Fitzpatrick et al. |
| 7,117,254 B2 | 10/2006 | Lunt et al. |
| 7,130,702 B2 | 10/2006 | Morrell |
| 7,136,915 B2 | 11/2006 | Rieger, III |
| 7,155,336 B2 | 12/2006 | Dorfman et al. |
| 7,158,878 B2 | 1/2007 | Rasmussen et al. |
| 7,174,301 B2 | 2/2007 | Florance et al. |
| 7,177,872 B2 | 2/2007 | Schwesig et al. |
| 7,178,720 B1 | 2/2007 | Strubbe et al. |
| 7,184,990 B2 | 2/2007 | Walker et al. |
| 7,188,056 B2 | 3/2007 | Kagarlis |
| 7,188,080 B1 | 3/2007 | Walker et al. |
| 7,188,153 B2 | 3/2007 | Lunt et al. |
| 7,209,803 B2 | 4/2007 | Okamoto et al. |
| 7,218,993 B2 | 5/2007 | Yasukawa et al. |
| 7,228,232 B2 * | 6/2007 | Bodin et al. ............... 701/301 |
| 7,233,942 B2 | 6/2007 | Nye |

(56) References Cited

U.S. PATENT DOCUMENTS

| | | |
|---|---|---|
| 7,249,123 B2 | 7/2007 | Elder et al. |
| 7,249,732 B2 | 7/2007 | Sanders, Jr. et al. |
| 7,251,647 B2 | 7/2007 | Hoblit |
| 7,254,559 B2 | 8/2007 | Florance et al. |
| 7,269,590 B2 | 9/2007 | Hull et al. |
| 7,293,019 B2 | 11/2007 | Dumais et al. |
| 7,296,026 B2 | 11/2007 | Patrick et al. |
| 7,306,186 B2 | 12/2007 | Kusic |
| 7,324,810 B2 | 1/2008 | Nave et al. |
| 7,343,564 B2 | 3/2008 | Othmer |
| 7,353,034 B2 | 4/2008 | Haney |
| 7,353,114 B1 | 4/2008 | Rohlf et al. |
| 7,353,199 B1 | 4/2008 | DiStefano, III |
| 7,359,871 B1 | 4/2008 | Paasche et al. |
| 7,359,894 B1 | 4/2008 | Liebman et al. |
| 7,373,244 B2 | 5/2008 | Kreft |
| 7,375,618 B2 | 5/2008 | Quintos |
| 7,383,251 B2 | 6/2008 | Might |
| 7,386,542 B2 | 6/2008 | Maybury et al. |
| 7,389,210 B2 | 6/2008 | Kagarlis |
| 7,424,438 B2 | 9/2008 | Vianello |
| 7,424,541 B2 | 9/2008 | Bourne |
| 7,426,970 B2 | 9/2008 | Olsen |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,444,241 B2 | 10/2008 | Grimm |
| 7,447,509 B2 | 11/2008 | Cossins et al. |
| 7,447,685 B2 | 11/2008 | Nye |
| 7,447,771 B1 | 11/2008 | Taylor |
| 7,454,524 B2 | 11/2008 | Jeong |
| 7,475,953 B2 | 1/2009 | Osborn et al. |
| 7,477,285 B1 | 1/2009 | Johnson |
| 7,478,324 B1 | 1/2009 | Ohtsu |
| 7,480,867 B1 | 1/2009 | Racine et al. |
| 7,483,960 B2 | 1/2009 | Kyusojin |
| 7,487,114 B2 | 2/2009 | Florance et al. |
| 7,496,603 B2 | 2/2009 | Deguchi et al. |
| 7,500,258 B1 | 3/2009 | Eldering |
| 7,505,919 B2 | 3/2009 | Richardson |
| 7,505,929 B2 | 3/2009 | Angert et al. |
| 7,520,466 B2 | 4/2009 | Bostan |
| 7,525,276 B2 | 4/2009 | Eaton |
| 7,561,169 B2 | 7/2009 | Carroll |
| 7,562,023 B2 | 7/2009 | Yamamoto |
| 7,580,862 B1 | 8/2009 | Montelo et al. |
| 7,581,702 B2 * | 9/2009 | Olson et al. .......... 244/189 |
| 7,587,276 B2 | 9/2009 | Gold et al. |
| 7,596,511 B2 | 9/2009 | Hall et al. |
| 7,599,795 B1 | 10/2009 | Blumberg et al. |
| 7,599,935 B2 | 10/2009 | La Rotonda et al. |
| 7,617,048 B2 | 11/2009 | Simon et al. |
| 7,636,687 B2 | 12/2009 | Foster et al. |
| 7,640,204 B2 | 12/2009 | Florance et al. |
| 7,658,346 B2 | 2/2010 | Goossen |
| 7,668,405 B2 | 2/2010 | Gallagher |
| 7,669,123 B2 | 2/2010 | Zuckerberg et al. |
| 7,680,673 B2 | 3/2010 | Wheeler |
| 7,680,859 B2 | 3/2010 | Schiller |
| 7,693,953 B2 | 4/2010 | Middleton et al. |
| 7,702,545 B1 | 4/2010 | Compton et al. |
| 7,725,492 B2 | 5/2010 | Sittig et al. |
| 7,734,254 B2 * | 6/2010 | Frost et al. .......... 455/41.2 |
| 7,751,971 B2 | 7/2010 | Chang et al. |
| 7,761,789 B2 | 7/2010 | Erol et al. |
| 7,792,815 B2 | 9/2010 | Aravamudan et al. |
| 7,797,256 B2 | 9/2010 | Zuckerberg et al. |
| 7,801,542 B1 | 9/2010 | Stewart |
| 7,802,290 B1 | 9/2010 | Bansal et al. |
| 7,808,378 B2 | 10/2010 | Hayden |
| 7,809,709 B1 | 10/2010 | Harrison, Jr. |
| 7,809,805 B2 | 10/2010 | Stremel et al. |
| 7,810,037 B1 | 10/2010 | Edwards et al. |
| 7,812,717 B1 | 10/2010 | Cona et al. |
| 7,823,073 B2 | 10/2010 | Holmes et al. |
| 7,827,052 B2 | 11/2010 | Scott et al. |
| 7,827,120 B1 | 11/2010 | Evans et al. |
| 7,827,208 B2 | 11/2010 | Bosworth et al. |
| 7,827,265 B2 | 11/2010 | Cheever et al. |
| 7,831,917 B1 | 11/2010 | Karam |
| 7,840,224 B2 | 11/2010 | Vengroff et al. |
| 7,840,319 B2 | 11/2010 | Zhong |
| 7,840,558 B2 | 11/2010 | Wiseman et al. |
| 7,848,765 B2 | 12/2010 | Phillips et al. |
| 7,853,518 B2 | 12/2010 | Cagan |
| 7,853,563 B2 | 12/2010 | Alvarado et al. |
| 7,860,889 B1 | 12/2010 | Martino et al. |
| 7,870,199 B2 | 1/2011 | Galli et al. |
| 7,873,471 B2 | 1/2011 | Gieseke |
| 7,881,864 B2 | 2/2011 | Smith |
| 7,886,024 B2 | 2/2011 | Kelly et al. |
| 7,894,933 B2 | 2/2011 | Mountz et al. |
| 7,894,939 B2 | 2/2011 | Zini et al. |
| 7,894,981 B2 | 2/2011 | Yamane et al. |
| 7,904,366 B2 | 3/2011 | Pogust |
| 7,913,179 B2 | 3/2011 | Sheha et al. |
| 7,933,808 B2 | 4/2011 | Garcia |
| 7,933,810 B2 | 4/2011 | Morgenstern |
| 7,945,653 B2 | 5/2011 | Zuckerberg et al. |
| 7,949,714 B1 | 5/2011 | Burnim |
| 7,958,011 B1 | 6/2011 | Cretney et al. |
| 7,961,986 B1 | 6/2011 | Jing et al. |
| 7,962,281 B2 | 6/2011 | Rasmussen et al. |
| 7,966,567 B2 | 6/2011 | Abhyanker |
| 7,969,606 B2 | 6/2011 | Chu |
| 7,970,657 B2 | 6/2011 | Morgenstern |
| 7,980,808 B2 | 7/2011 | Chilson et al. |
| 7,991,703 B1 | 8/2011 | Watkins |
| 7,996,109 B2 | 8/2011 | Zini et al. |
| 7,996,270 B2 | 8/2011 | Sundaresan |
| 8,010,230 B2 | 8/2011 | Zini et al. |
| 8,027,943 B2 | 9/2011 | Juan et al. |
| 8,046,309 B2 | 10/2011 | Evans et al. |
| 8,051,089 B2 | 11/2011 | Gargi et al. |
| 8,060,389 B2 | 11/2011 | Johnson |
| 8,060,555 B2 | 11/2011 | Grayson et al. |
| 8,064,590 B2 | 11/2011 | Abhyanker |
| 8,065,291 B2 | 11/2011 | Knorr |
| 8,095,430 B2 | 1/2012 | Abhyanker |
| 8,103,734 B2 | 1/2012 | Galli et al. |
| 8,107,879 B2 | 1/2012 | Pering et al. |
| 8,108,501 B2 | 1/2012 | Birnie et al. |
| 8,112,419 B2 | 2/2012 | Hancock et al. |
| 8,117,486 B2 | 2/2012 | Handley |
| 8,136,145 B2 | 3/2012 | Fetterman et al. |
| 8,139,514 B2 | 3/2012 | Weber et al. |
| 8,145,661 B1 | 3/2012 | Billman et al. |
| 8,145,703 B2 | 3/2012 | Frishert et al. |
| 8,149,113 B2 | 4/2012 | Diem |
| 8,167,234 B1 | 5/2012 | Moore |
| 8,171,128 B2 | 5/2012 | Zuckerberg et al. |
| 8,190,357 B2 | 5/2012 | Abhyanker et al. |
| 8,190,476 B2 | 5/2012 | Urbanski et al. |
| 8,195,601 B2 | 6/2012 | Law et al. |
| 8,195,744 B2 | 6/2012 | Julia et al. |
| 8,204,624 B2 | 6/2012 | Zini et al. |
| 8,204,776 B2 | 6/2012 | Abhyanker |
| 8,204,952 B2 | 6/2012 | Stremel et al. |
| 8,223,012 B1 | 7/2012 | Diem |
| 8,225,376 B2 | 7/2012 | Zuckerberg et al. |
| 8,229,470 B1 | 7/2012 | Ranjan et al. |
| 8,249,943 B2 | 8/2012 | Zuckerberg et al. |
| 8,271,057 B2 | 9/2012 | Levine et al. |
| 8,275,546 B2 | 9/2012 | Xiao et al. |
| 8,290,943 B2 | 10/2012 | Carbone et al. |
| 8,292,215 B2 | 10/2012 | Olm et al. |
| 8,296,373 B2 | 10/2012 | Bosworth et al. |
| 8,301,743 B2 | 10/2012 | Curran et al. |
| 8,315,389 B2 | 11/2012 | Qiu et al. |
| 8,326,091 B1 | 12/2012 | Jing et al. |
| 8,326,315 B2 | 12/2012 | Phillips et al. |
| 8,328,130 B2 | 12/2012 | Goossen |
| 8,352,183 B2 | 1/2013 | Thota et al. |

(56) References Cited

U.S. PATENT DOCUMENTS

| | | |
|---|---|---|
| 8,364,757 B2 | 1/2013 | Scott et al. |
| 8,370,003 B2 * | 2/2013 | So et al. .................... 701/3 |
| 8,380,382 B2 | 2/2013 | Sung et al. |
| 8,380,638 B1 | 2/2013 | Watkins |
| 8,391,789 B2 | 3/2013 | Palin et al. |
| 8,391,909 B2 | 3/2013 | Stewart |
| 8,401,771 B2 | 3/2013 | Krumm et al. |
| 8,402,094 B2 | 3/2013 | Bosworth et al. |
| 8,402,372 B2 | 3/2013 | Gillespie et al. |
| 8,412,576 B2 | 4/2013 | Urbanski |
| 8,412,675 B2 | 4/2013 | Alvarado et al. |
| 8,427,308 B1 | 4/2013 | Baron, Sr. et al. |
| 8,428,565 B2 | 4/2013 | Middleton et al. |
| 8,433,609 B2 | 4/2013 | Abhyanker |
| 8,433,650 B1 | 4/2013 | Thomas |
| 8,438,156 B2 | 5/2013 | Redstone et al. |
| 8,442,923 B2 | 5/2013 | Gross |
| 8,443,107 B2 | 5/2013 | Burdette et al. |
| 8,447,810 B2 | 5/2013 | Roumeliotis et al. |
| 8,463,295 B1 | 6/2013 | Caralis et al. |
| 8,463,764 B2 | 6/2013 | Fujioka et al. |
| 8,473,199 B2 | 6/2013 | Blumberg et al. |
| 8,493,849 B2 | 7/2013 | Fuste Vilella et al. |
| 8,504,284 B2 | 8/2013 | Brülle-Drews et al. |
| 8,504,512 B2 | 8/2013 | Herzog et al. |
| 8,510,268 B1 | 8/2013 | Laforge et al. |
| 8,515,609 B2 | 8/2013 | McAndrew et al. |
| 8,521,656 B2 | 8/2013 | Zimberoff et al. |
| 8,538,458 B2 | 9/2013 | Haney |
| 8,543,143 B2 | 9/2013 | Chandra et al. |
| 8,543,323 B1 | 9/2013 | Gold et al. |
| 8,548,493 B2 | 10/2013 | Rieger, III |
| 8,554,770 B2 | 10/2013 | Purdy |
| 8,554,852 B2 | 10/2013 | Burnim |
| 8,560,515 B2 | 10/2013 | Kimchi et al. |
| 8,584,091 B2 | 11/2013 | Champion et al. |
| 8,589,330 B2 | 11/2013 | Petersen et al. |
| 8,594,715 B1 | 11/2013 | Stewart |
| 8,595,292 B2 | 11/2013 | Grayson et al. |
| 8,600,602 B1 * | 12/2013 | McAndrew et al. .......... 701/23 |
| 8,615,565 B2 | 12/2013 | Randall |
| 8,620,532 B2 | 12/2013 | Curtis et al. |
| 8,620,827 B1 | 12/2013 | Watkins, III |
| 8,621,374 B2 | 12/2013 | Sheha et al. |
| 8,626,699 B2 | 1/2014 | Xie et al. |
| 8,627,506 B2 | 1/2014 | Vera et al. |
| 8,649,976 B2 | 2/2014 | Kreft |
| 8,650,103 B2 | 2/2014 | Wilf et al. |
| 8,655,873 B2 | 2/2014 | Mitchell et al. |
| 8,660,541 B1 | 2/2014 | Beresniewicz et al. |
| 8,660,897 B2 | 2/2014 | Abhyanker |
| 8,666,660 B2 | 3/2014 | Sartipi et al. |
| 8,671,095 B2 | 3/2014 | Gross |
| 8,671,106 B1 | 3/2014 | Lee et al. |
| 8,683,342 B2 | 3/2014 | Van Riel |
| 8,688,594 B2 | 4/2014 | Thomas et al. |
| 8,694,605 B1 | 4/2014 | Burrell et al. |
| 8,695,919 B2 | 4/2014 | Shachor et al. |
| 8,712,441 B2 | 4/2014 | Haney |
| 8,713,055 B2 | 4/2014 | Callahan et al. |
| 8,713,143 B2 | 4/2014 | Centola et al. |
| 8,718,910 B2 | 5/2014 | Guéziec |
| 8,723,679 B2 | 5/2014 | Whisenant |
| 8,732,091 B1 | 5/2014 | Abhyanker |
| 8,732,155 B2 | 5/2014 | Vegnaduzzo et al. |
| 8,732,219 B1 | 5/2014 | Ferries et al. |
| 8,732,846 B2 | 5/2014 | D'Angelo et al. |
| 8,738,545 B2 | 5/2014 | Abhyanker |
| 8,775,405 B2 | 7/2014 | Gross |
| D710,454 S | 8/2014 | Barajas et al. |
| 8,794,566 B2 | 8/2014 | Hutson |
| 8,799,253 B2 | 8/2014 | Valliani et al. |
| 8,825,226 B1 | 9/2014 | Worley, III et al. |
| 8,832,556 B2 | 9/2014 | Steinberg |
| 2001/0005829 A1 | 6/2001 | Raveis |
| 2001/0016795 A1 | 8/2001 | Bellinger |
| 2001/0020955 A1 | 9/2001 | Nakagawa et al. |
| 2001/0029426 A1 | 10/2001 | Hancock et al. |
| 2001/0029501 A1 | 10/2001 | Yokobori et al. |
| 2001/0036833 A1 | 11/2001 | Koshima et al. |
| 2001/0037721 A1 | 11/2001 | Hasegawa et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0019739 A1 | 2/2002 | Juneau et al. |
| 2002/0023018 A1 | 2/2002 | Kleinbaum |
| 2002/0026388 A1 | 2/2002 | Roebuck |
| 2002/0029350 A1 | 3/2002 | Cooper et al. |
| 2002/0030689 A1 | 3/2002 | Eichel et al. |
| 2002/0038225 A1 | 3/2002 | Klasky et al. |
| 2002/0046131 A1 | 4/2002 | Boone et al. |
| 2002/0046243 A1 | 4/2002 | Morris et al. |
| 2002/0049617 A1 | 4/2002 | Lencki et al. |
| 2002/0059201 A1 | 5/2002 | Work |
| 2002/0059379 A1 | 5/2002 | Harvey et al. |
| 2002/0065691 A1 | 5/2002 | Twig et al. |
| 2002/0065739 A1 | 5/2002 | Florance et al. |
| 2002/0070967 A1 | 6/2002 | Tanner et al. |
| 2002/0072848 A1 | 6/2002 | Hamada et al. |
| 2002/0077060 A1 | 6/2002 | Lehikoinen et al. |
| 2002/0077901 A1 | 6/2002 | Katz |
| 2002/0078171 A1 | 6/2002 | Schneider |
| 2002/0087260 A1 | 7/2002 | Hancock et al. |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0099693 A1 | 7/2002 | Kofsky |
| 2002/0103813 A1 | 8/2002 | Frigon |
| 2002/0103892 A1 | 8/2002 | Rieger |
| 2002/0124009 A1 | 9/2002 | Hoblit |
| 2002/0124053 A1 | 9/2002 | Adams et al. |
| 2002/0130906 A1 | 9/2002 | Miyaki |
| 2002/0133292 A1 | 9/2002 | Miyaki |
| 2002/0143462 A1 | 10/2002 | Warren |
| 2002/0147638 A1 | 10/2002 | Banerjee et al. |
| 2002/0156782 A1 | 10/2002 | Rubert |
| 2002/0156917 A1 | 10/2002 | Nye |
| 2002/0160762 A1 | 10/2002 | Nave et al. |
| 2002/0161666 A1 | 10/2002 | Fraki et al. |
| 2002/0169662 A1 | 11/2002 | Claiborne |
| 2002/0184496 A1 | 12/2002 | Mitchell et al. |
| 2002/0188522 A1 | 12/2002 | McCall et al. |
| 2003/0004802 A1 | 1/2003 | Callegari |
| 2003/0005035 A1 | 1/2003 | Rodgers |
| 2003/0018521 A1 | 1/2003 | Kraft et al. |
| 2003/0023489 A1 | 1/2003 | McGuire et al. |
| 2003/0023586 A1 | 1/2003 | Knorr |
| 2003/0033176 A1 | 2/2003 | Hancock |
| 2003/0036958 A1 | 2/2003 | Warmus et al. |
| 2003/0036963 A1 | 2/2003 | Jacobson et al. |
| 2003/0055983 A1 | 3/2003 | Callegari |
| 2003/0061503 A1 | 3/2003 | Katz et al. |
| 2003/0063072 A1 | 4/2003 | Brandenberg et al. |
| 2003/0064705 A1 | 4/2003 | Desiderio |
| 2003/0065716 A1 | 4/2003 | Kyusojin |
| 2003/0069002 A1 | 4/2003 | Hunter et al. |
| 2003/0069693 A1 | 4/2003 | Snapp et al. |
| 2003/0078897 A1 | 4/2003 | Florance et al. |
| 2003/0088520 A1 | 5/2003 | Bohrer et al. |
| 2003/0145093 A1 | 7/2003 | Oren et al. |
| 2003/0154020 A1 | 8/2003 | Polidi |
| 2003/0154213 A1 | 8/2003 | Ahn |
| 2003/0158668 A1 | 8/2003 | Anderson |
| 2003/0177019 A1 | 9/2003 | Santos et al. |
| 2003/0177192 A1 | 9/2003 | Umeki et al. |
| 2003/0182222 A1 | 9/2003 | Rotman et al. |
| 2003/0200192 A1 | 10/2003 | Bell et al. |
| 2003/0218253 A1 | 11/2003 | Avanzino et al. |
| 2003/0220807 A1 | 11/2003 | Hoffman et al. |
| 2003/0222918 A1 | 12/2003 | Coulthard |
| 2003/0225632 A1 | 12/2003 | Tong et al. |
| 2003/0225833 A1 | 12/2003 | Pilat et al. |
| 2004/0002871 A1 | 1/2004 | Geranio |

(56) References Cited

U.S. PATENT DOCUMENTS

| | | |
|---|---|---|
| 2004/0003283 A1 | 1/2004 | Goodman et al. |
| 2004/0021584 A1 | 2/2004 | Hartz et al. |
| 2004/0024846 A1 | 2/2004 | Randall et al. |
| 2004/0030525 A1 | 2/2004 | Robinson et al. |
| 2004/0030741 A1 | 2/2004 | Wolton et al. |
| 2004/0039581 A1 | 2/2004 | Wheeler |
| 2004/0054428 A1 | 3/2004 | Sheha et al. |
| 2004/0056762 A1 | 3/2004 | Rogers |
| 2004/0088177 A1 | 5/2004 | Travis et al. |
| 2004/0109012 A1 | 6/2004 | Kraus et al. |
| 2004/0111302 A1 | 6/2004 | Falk et al. |
| 2004/0122570 A1 | 6/2004 | Sonoyama et al. |
| 2004/0122693 A1 | 6/2004 | Hatscher et al. |
| 2004/0128215 A1 | 7/2004 | Florance et al. |
| 2004/0135805 A1 | 7/2004 | Gottsacker et al. |
| 2004/0139034 A1 | 7/2004 | Farmer |
| 2004/0139049 A1 | 7/2004 | Hancock et al. |
| 2004/0145593 A1 | 7/2004 | Berkner et al. |
| 2004/0146199 A1 | 7/2004 | Berkner et al. |
| 2004/0148275 A1 | 7/2004 | Achlioptas |
| 2004/0153466 A1 | 8/2004 | Ziff et al. |
| 2004/0157648 A1 | 8/2004 | Lightman |
| 2004/0158488 A1 | 8/2004 | Johnson |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0172280 A1 | 9/2004 | Fraki et al. |
| 2004/0186766 A1 | 9/2004 | Fellenstein et al. |
| 2004/0210661 A1 | 10/2004 | Thompson |
| 2004/0215517 A1 | 10/2004 | Chen et al. |
| 2004/0215559 A1 | 10/2004 | Rebenack et al. |
| 2004/0217884 A1 | 11/2004 | Samadani et al. |
| 2004/0217980 A1 | 11/2004 | Radburn et al. |
| 2004/0220903 A1 | 11/2004 | Shah et al. |
| 2004/0220906 A1 | 11/2004 | Gargi et al. |
| 2004/0230562 A1 | 11/2004 | Wysoczanski et al. |
| 2004/0236771 A1 | 11/2004 | Colver et al. |
| 2004/0243478 A1 | 12/2004 | Walker et al. |
| 2004/0257340 A1 | 12/2004 | Jawerth |
| 2004/0260604 A1 | 12/2004 | Bedingfield |
| 2004/0260677 A1 | 12/2004 | Malpani et al. |
| 2004/0267625 A1 | 12/2004 | Feng et al. |
| 2005/0015488 A1 | 1/2005 | Bayyapu |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1 | 2/2005 | Riegelman et al. |
| 2005/0044061 A1 | 2/2005 | Klemow |
| 2005/0049971 A1 | 3/2005 | Bettinger |
| 2005/0055353 A1 | 3/2005 | Marx et al. |
| 2005/0086309 A1 | 4/2005 | Galli et al. |
| 2005/0091027 A1 | 4/2005 | Zaher et al. |
| 2005/0091175 A9 | 4/2005 | Farmer |
| 2005/0091209 A1 | 4/2005 | Frank et al. |
| 2005/0094851 A1* | 5/2005 | Bodin et al. ............ 382/106 |
| 2005/0096977 A1 | 5/2005 | Rossides |
| 2005/0097319 A1 | 5/2005 | Zhu et al. |
| 2005/0108520 A1 | 5/2005 | Yamamoto et al. |
| 2005/0114527 A1 | 5/2005 | Hankey et al. |
| 2005/0114759 A1 | 5/2005 | Williams et al. |
| 2005/0114783 A1 | 5/2005 | Szeto |
| 2005/0120084 A1 | 6/2005 | Hu et al. |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0144065 A1 | 6/2005 | Calabria et al. |
| 2005/0149432 A1 | 7/2005 | Galey |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0177385 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0193410 A1 | 9/2005 | Eldering |
| 2005/0197775 A1 | 9/2005 | Smith |
| 2005/0197846 A1 | 9/2005 | Pezaris et al. |
| 2005/0197950 A1 | 9/2005 | Moya et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203768 A1 | 9/2005 | Florance et al. |
| 2005/0203769 A1 | 9/2005 | Weild |
| 2005/0203807 A1 | 9/2005 | Bezos et al. |
| 2005/0209776 A1 | 9/2005 | Ogino |
| 2005/0209781 A1 | 9/2005 | Anderson |
| 2005/0216186 A1 | 9/2005 | Dorfman et al. |
| 2005/0216300 A1 | 9/2005 | Appelman et al. |
| 2005/0216550 A1 | 9/2005 | Paseman et al. |
| 2005/0219044 A1 | 10/2005 | Douglass et al. |
| 2005/0235062 A1 | 10/2005 | Lunt et al. |
| 2005/0240580 A1 | 10/2005 | Zamir et al. |
| 2005/0251331 A1 | 11/2005 | Kreft |
| 2005/0256756 A1 | 11/2005 | Lam et al. |
| 2005/0259648 A1 | 11/2005 | Kodialam et al. |
| 2005/0270299 A1 | 12/2005 | Rasmussen et al. |
| 2005/0273346 A1 | 12/2005 | Frost |
| 2005/0283497 A1 | 12/2005 | Nurminen et al. |
| 2005/0288957 A1 | 12/2005 | Eraker et al. |
| 2005/0288958 A1 | 12/2005 | Eraker et al. |
| 2005/0289650 A1 | 12/2005 | Kalogridis |
| 2006/0004680 A1 | 1/2006 | Robarts et al. |
| 2006/0004703 A1 | 1/2006 | Spivack et al. |
| 2006/0004734 A1 | 1/2006 | Malkin et al. |
| 2006/0022048 A1 | 2/2006 | Johnson |
| 2006/0023881 A1 | 2/2006 | Akiyama et al. |
| 2006/0025883 A1 | 2/2006 | Reeves |
| 2006/0026147 A1 | 2/2006 | Cone et al. |
| 2006/0036588 A1 | 2/2006 | Frank et al. |
| 2006/0036748 A1 | 2/2006 | Nusbaum et al. |
| 2006/0041543 A1 | 2/2006 | Achlioptas |
| 2006/0042483 A1 | 3/2006 | Work et al. |
| 2006/0047825 A1 | 3/2006 | Steenstra et al. |
| 2006/0048059 A1 | 3/2006 | Etkin |
| 2006/0052091 A1 | 3/2006 | Onyon et al. |
| 2006/0058921 A1 | 3/2006 | Okamoto |
| 2006/0058952 A1 | 3/2006 | Cooper et al. |
| 2006/0059023 A1 | 3/2006 | Mashinsky |
| 2006/0064431 A1 | 3/2006 | Kishore et al. |
| 2006/0074780 A1 | 4/2006 | Taylor et al. |
| 2006/0075335 A1 | 4/2006 | Gloor |
| 2006/0080613 A1 | 4/2006 | Savant |
| 2006/0085419 A1 | 4/2006 | Rosen |
| 2006/0088145 A1 | 4/2006 | Reed et al. |
| 2006/0089882 A1 | 4/2006 | Shimansky |
| 2006/0100892 A1 | 5/2006 | Ellanti |
| 2006/0113425 A1 | 6/2006 | Rader |
| 2006/0123053 A1 | 6/2006 | Scannell |
| 2006/0125616 A1 | 6/2006 | Song |
| 2006/0136127 A1 | 6/2006 | Coch et al. |
| 2006/0136419 A1 | 6/2006 | Brydon et al. |
| 2006/0143066 A1 | 6/2006 | Calabria |
| 2006/0143067 A1 | 6/2006 | Calabria |
| 2006/0143083 A1 | 6/2006 | Wedeen |
| 2006/0143183 A1 | 6/2006 | Goldberg et al. |
| 2006/0149624 A1 | 7/2006 | Baluja et al. |
| 2006/0161599 A1 | 7/2006 | Rosen |
| 2006/0178972 A1 | 8/2006 | Jung et al. |
| 2006/0184578 A1 | 8/2006 | La Rotonda et al. |
| 2006/0184617 A1 | 8/2006 | Nicholas et al. |
| 2006/0184997 A1 | 8/2006 | La Rotonda et al. |
| 2006/0190279 A1 | 8/2006 | Heflin |
| 2006/0190281 A1 | 8/2006 | Kott et al. |
| 2006/0194186 A1 | 8/2006 | Nanda |
| 2006/0200384 A1 | 9/2006 | Arutunian et al. |
| 2006/0212407 A1 | 9/2006 | Lyon |
| 2006/0217885 A1 | 9/2006 | Crady et al. |
| 2006/0218225 A1 | 9/2006 | Hee Voon et al. |
| 2006/0218226 A1 | 9/2006 | Johnson et al. |
| 2006/0223518 A1 | 10/2006 | Haney |

(56) References Cited

U.S. PATENT DOCUMENTS

| | | |
|---|---|---|
| 2006/0226281 A1 | 10/2006 | Walton |
| 2006/0229063 A1 | 10/2006 | Koch |
| 2006/0230061 A1 | 10/2006 | Sample et al. |
| 2006/0238383 A1 | 10/2006 | Kimchi et al. |
| 2006/0242139 A1 | 10/2006 | Butterfield et al. |
| 2006/0242178 A1 | 10/2006 | Butterfield et al. |
| 2006/0242581 A1 | 10/2006 | Manion et al. |
| 2006/0247940 A1 | 11/2006 | Zhu et al. |
| 2006/0248573 A1 | 11/2006 | Pannu et al. |
| 2006/0251292 A1 | 11/2006 | Gokturk et al. |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265277 A1 | 11/2006 | Yasinovsky et al. |
| 2006/0265417 A1 | 11/2006 | Amato et al. |
| 2006/0270419 A1 | 11/2006 | Crowley et al. |
| 2006/0270421 A1 | 11/2006 | Phillips et al. |
| 2006/0271287 A1 | 11/2006 | Gold et al. |
| 2006/0271472 A1 | 11/2006 | Cagan |
| 2006/0293976 A1 | 12/2006 | Nam |
| 2006/0294011 A1 | 12/2006 | Smith |
| 2007/0002057 A1 | 1/2007 | Danzig et al. |
| 2007/0003182 A1 | 1/2007 | Hunn |
| 2007/0005683 A1 | 1/2007 | Omidyar |
| 2007/0005750 A1 | 1/2007 | Lunt et al. |
| 2007/0011148 A1 | 1/2007 | Burkey et al. |
| 2007/0011617 A1 | 1/2007 | Akagawa et al. |
| 2007/0016689 A1 | 1/2007 | Birch |
| 2007/0027920 A1 | 2/2007 | Alvarado et al. |
| 2007/0032942 A1 | 2/2007 | Thota |
| 2007/0033064 A1 | 2/2007 | Abrahamsohn |
| 2007/0033182 A1 | 2/2007 | Knorr |
| 2007/0038646 A1 | 2/2007 | Thota |
| 2007/0043947 A1 | 2/2007 | Mizikovsky et al. |
| 2007/0050360 A1 | 3/2007 | Hull et al. |
| 2007/0061128 A1 | 3/2007 | Odom et al. |
| 2007/0061405 A1 | 3/2007 | Keohane et al. |
| 2007/0067219 A1 | 3/2007 | Altberg et al. |
| 2007/0078747 A1 | 4/2007 | Baack |
| 2007/0078772 A1 | 4/2007 | Dadd |
| 2007/0099609 A1 | 5/2007 | Cai |
| 2007/0105536 A1 | 5/2007 | Tingo |
| 2007/0106627 A1 | 5/2007 | Srivastava et al. |
| 2007/0112461 A1 | 5/2007 | Zini et al. |
| 2007/0112645 A1 | 5/2007 | Traynor et al. |
| 2007/0112729 A1 | 5/2007 | Wiseman et al. |
| 2007/0118430 A1 | 5/2007 | Wiseman et al. |
| 2007/0118525 A1 | 5/2007 | Svendsen |
| 2007/0150375 A1 | 6/2007 | Yang |
| 2007/0150603 A1 | 6/2007 | Crull et al. |
| 2007/0156429 A1 | 7/2007 | Godar |
| 2007/0159651 A1 | 7/2007 | Disario et al. |
| 2007/0162432 A1 | 7/2007 | Armstrong et al. |
| 2007/0162458 A1 | 7/2007 | Fasciano |
| 2007/0162547 A1 | 7/2007 | Ross |
| 2007/0162942 A1 | 7/2007 | Hamynen et al. |
| 2007/0167204 A1 | 7/2007 | Lyle et al. |
| 2007/0168852 A1 | 7/2007 | Erol et al. |
| 2007/0168888 A1 | 7/2007 | Jawerth |
| 2007/0174389 A1 | 7/2007 | Armstrong et al. |
| 2007/0179905 A1 | 8/2007 | Buch et al. |
| 2007/0185906 A1 | 8/2007 | Humphries et al. |
| 2007/0192299 A1 | 8/2007 | Zuckerberg et al. |
| 2007/0203644 A1 | 8/2007 | Thota et al. |
| 2007/0203820 A1 | 8/2007 | Rashid |
| 2007/0207755 A1 | 9/2007 | Julia et al. |
| 2007/0208613 A1 | 9/2007 | Backer |
| 2007/0208802 A1 | 9/2007 | Barman et al. |
| 2007/0208916 A1 | 9/2007 | Tomita |
| 2007/0214141 A1 | 9/2007 | Sittig et al. |
| 2007/0218900 A1 | 9/2007 | Abhyanker |
| 2007/0219659 A1 | 9/2007 | Abhyanker et al. |
| 2007/0219712 A1 | 9/2007 | Abhyanker |
| 2007/0220174 A1 | 9/2007 | Abhyanker |
| 2007/0226314 A1 | 9/2007 | Eick et al. |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0233582 A1 | 10/2007 | Abhyanker |
| 2007/0239352 A1 | 10/2007 | Thota et al. |
| 2007/0239552 A1 | 10/2007 | Sundaresan |
| 2007/0239648 A1 | 10/2007 | Thota |
| 2007/0245002 A1 | 10/2007 | Nguyen et al. |
| 2007/0250321 A1 | 10/2007 | Balusu |
| 2007/0250511 A1 | 10/2007 | Endler et al. |
| 2007/0255785 A1 | 11/2007 | Hayashi et al. |
| 2007/0255831 A1 | 11/2007 | Hayashi et al. |
| 2007/0258642 A1 | 11/2007 | Thota |
| 2007/0259654 A1 | 11/2007 | Oijer |
| 2007/0260599 A1 | 11/2007 | McGuire et al. |
| 2007/0261071 A1 | 11/2007 | Lunt et al. |
| 2007/0266003 A1 | 11/2007 | Wong et al. |
| 2007/0266097 A1 | 11/2007 | Harik et al. |
| 2007/0266118 A1 | 11/2007 | Wilkins |
| 2007/0268310 A1 | 11/2007 | Dolph et al. |
| 2007/0270163 A1 | 11/2007 | Anupam et al. |
| 2007/0271367 A1 | 11/2007 | Yardeni et al. |
| 2007/0273558 A1 | 11/2007 | Smith et al. |
| 2007/0281689 A1 | 12/2007 | Altman et al. |
| 2007/0281690 A1 | 12/2007 | Altman et al. |
| 2007/0281716 A1 | 12/2007 | Altman et al. |
| 2007/0282621 A1 | 12/2007 | Altman et al. |
| 2007/0282987 A1 | 12/2007 | Fischer et al. |
| 2007/0288164 A1 | 12/2007 | Gordon et al. |
| 2007/0288311 A1 | 12/2007 | Underhill |
| 2007/0288621 A1 | 12/2007 | Gundu et al. |
| 2007/0294357 A1 | 12/2007 | Antoine |
| 2008/0005076 A1 | 1/2008 | Payne et al. |
| 2008/0005231 A1 | 1/2008 | Kelley et al. |
| 2008/0010343 A1 | 1/2008 | Escaffi et al. |
| 2008/0010365 A1 | 1/2008 | Schneider |
| 2008/0016051 A1 | 1/2008 | Schiller |
| 2008/0020814 A1 | 1/2008 | Kernene |
| 2008/0032666 A1 | 2/2008 | Hughes et al. |
| 2008/0032703 A1 | 2/2008 | Krumm et al. |
| 2008/0033641 A1 | 2/2008 | Medalia |
| 2008/0033652 A1 | 2/2008 | Hensley et al. |
| 2008/0033739 A1 | 2/2008 | Zuckerberg et al. |
| 2008/0033776 A1 | 2/2008 | Marchese |
| 2008/0040370 A1 | 2/2008 | Bosworth et al. |
| 2008/0040428 A1 | 2/2008 | Wei et al. |
| 2008/0040474 A1 | 2/2008 | Zuckerberg et al. |
| 2008/0040475 A1 | 2/2008 | Bosworth et al. |
| 2008/0040673 A1 | 2/2008 | Zuckerberg et al. |
| 2008/0043020 A1 | 2/2008 | Snow et al. |
| 2008/0043037 A1 | 2/2008 | Carroll |
| 2008/0046976 A1 | 2/2008 | Zuckerberg |
| 2008/0048065 A1 | 2/2008 | Kuntz |
| 2008/0051932 A1 | 2/2008 | Jermyn et al. |
| 2008/0059992 A1 | 3/2008 | Amidon et al. |
| 2008/0065321 A1 | 3/2008 | DaCosta |
| 2008/0065611 A1 | 3/2008 | Hepworth et al. |
| 2008/0070593 A1 | 3/2008 | Altman et al. |
| 2008/0070697 A1 | 3/2008 | Robinson et al. |
| 2008/0071929 A1 | 3/2008 | Motte et al. |
| 2008/0077464 A1 | 3/2008 | Gottlieb et al. |
| 2008/0077581 A1 | 3/2008 | Drayer et al. |
| 2008/0077642 A1 | 3/2008 | Carbone et al. |
| 2008/0077708 A1 | 3/2008 | Scott et al. |
| 2008/0086368 A1 | 4/2008 | Bauman et al. |
| 2008/0086458 A1 | 4/2008 | Robinson et al. |
| 2008/0091461 A1 | 4/2008 | Evans et al. |
| 2008/0091723 A1 | 4/2008 | Zuckerberg et al. |
| 2008/0091786 A1 | 4/2008 | Jhanji |
| 2008/0097999 A1 | 4/2008 | Horan |
| 2008/0098090 A1 | 4/2008 | Geraci et al. |
| 2008/0098313 A1 | 4/2008 | Pollack |
| 2008/0103959 A1 | 5/2008 | Carroll et al. |
| 2008/0104227 A1 | 5/2008 | Birnie et al. |
| 2008/0109718 A1 | 5/2008 | Narayanaswami |
| 2008/0115082 A1 | 5/2008 | Simmons et al. |
| 2008/0115226 A1 | 5/2008 | Welingkar et al. |
| 2008/0117928 A1 | 5/2008 | Abhyanker |
| 2008/0125969 A1 | 5/2008 | Chen et al. |

(56) References Cited

U.S. PATENT DOCUMENTS

| | | |
|---|---|---|
| 2008/0126355 A1 | 5/2008 | Rowley |
| 2008/0126411 A1 | 5/2008 | Zhuang et al. |
| 2008/0126476 A1 | 5/2008 | Nicholas et al. |
| 2008/0126478 A1 | 5/2008 | Ferguson et al. |
| 2008/0133495 A1 | 6/2008 | Fischer |
| 2008/0133649 A1 | 6/2008 | Pennington |
| 2008/0134035 A1 | 6/2008 | Pennington et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162027 A1 | 7/2008 | Murphy et al. |
| 2008/0162211 A1 | 7/2008 | Addington |
| 2008/0162260 A1 | 7/2008 | Rohan et al. |
| 2008/0167771 A1 | 7/2008 | Whittaker et al. |
| 2008/0168068 A1 | 7/2008 | Hutheesing |
| 2008/0168175 A1 | 7/2008 | Tran |
| 2008/0172173 A1 | 7/2008 | Chang et al. |
| 2008/0172244 A1 | 7/2008 | Coupal et al. |
| 2008/0172288 A1 | 7/2008 | Pilskalns et al. |
| 2008/0189292 A1 | 8/2008 | Stremel et al. |
| 2008/0189380 A1 | 8/2008 | Bosworth et al. |
| 2008/0189768 A1 | 8/2008 | Callahan et al. |
| 2008/0195483 A1 | 8/2008 | Moore |
| 2008/0201156 A1 | 8/2008 | Abhyanker |
| 2008/0208956 A1 | 8/2008 | Spiridellis et al. |
| 2008/0208969 A1 | 8/2008 | Van Riel |
| 2008/0215994 A1 | 9/2008 | Harrison et al. |
| 2008/0221846 A1 | 9/2008 | Aggarwal et al. |
| 2008/0221984 A1 | 9/2008 | Abhyanker |
| 2008/0222140 A1 | 9/2008 | Lagad et al. |
| 2008/0222308 A1 | 9/2008 | Abhyanker |
| 2008/0228719 A1 | 9/2008 | Abhyanker et al. |
| 2008/0228775 A1 | 9/2008 | Abhyanker et al. |
| 2008/0229424 A1 | 9/2008 | Harris et al. |
| 2008/0231630 A1 | 9/2008 | Shenkar et al. |
| 2008/0238941 A1 | 10/2008 | Kinnan et al. |
| 2008/0240397 A1 | 10/2008 | Abhyanker |
| 2008/0242317 A1 | 10/2008 | Abhyanker |
| 2008/0243378 A1 | 10/2008 | Zavoli |
| 2008/0243598 A1 | 10/2008 | Abhyanker |
| 2008/0243667 A1 | 10/2008 | Lecomte |
| 2008/0243830 A1 | 10/2008 | Abhyanker |
| 2008/0250025 A1 | 10/2008 | Abhyanker |
| 2008/0255759 A1 | 10/2008 | Abhyanker |
| 2008/0256230 A1 | 10/2008 | Handley |
| 2008/0263460 A1 | 10/2008 | Altberg et al. |
| 2008/0269992 A1 | 10/2008 | Kawasaki |
| 2008/0270158 A1 | 10/2008 | Abhyanker |
| 2008/0270366 A1 | 10/2008 | Frank |
| 2008/0270615 A1 | 10/2008 | Centola et al. |
| 2008/0270945 A1 | 10/2008 | Abhyanker |
| 2008/0281854 A1 | 11/2008 | Abhyanker |
| 2008/0288277 A1 | 11/2008 | Fasciano |
| 2008/0288612 A1 | 11/2008 | Kwon |
| 2008/0294678 A1 | 11/2008 | Gorman et al. |
| 2008/0294747 A1 | 11/2008 | Abhyanker |
| 2008/0300979 A1 | 12/2008 | Abhyanker |
| 2008/0301565 A1 | 12/2008 | Abhyanker |
| 2008/0306754 A1 | 12/2008 | Abhyanker |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0316021 A1 | 12/2008 | Manz et al. |
| 2008/0319778 A1 | 12/2008 | Abhyanker |
| 2008/0319806 A1 | 12/2008 | Abhyanker |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0018850 A1 | 1/2009 | Abhyanker |
| 2009/0018925 A1 | 1/2009 | Abhyanker |
| 2009/0019004 A1 | 1/2009 | Abhyanker |
| 2009/0019085 A1 | 1/2009 | Abhyanker |
| 2009/0019122 A1 | 1/2009 | Abhyanker |
| 2009/0019366 A1 | 1/2009 | Abhyanker |
| 2009/0019373 A1 | 1/2009 | Abhyanker |
| 2009/0024740 A1 | 1/2009 | Abhyanker |
| 2009/0029672 A1 | 1/2009 | Manz |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0031301 A1 | 1/2009 | D'Angelo et al. |
| 2009/0043650 A1 | 2/2009 | Abhyanker et al. |
| 2009/0044254 A1 | 2/2009 | Tian |
| 2009/0048922 A1 | 2/2009 | Morgenstern et al. |
| 2009/0049018 A1 | 2/2009 | Gross |
| 2009/0049037 A1 | 2/2009 | Gross |
| 2009/0049070 A1 | 2/2009 | Steinberg |
| 2009/0049127 A1 | 2/2009 | Juan et al. |
| 2009/0061883 A1 | 3/2009 | Abhyanker |
| 2009/0063252 A1 | 3/2009 | Abhyanker |
| 2009/0063467 A1 | 3/2009 | Abhyanker |
| 2009/0063500 A1 | 3/2009 | Zhai et al. |
| 2009/0064011 A1 | 3/2009 | Abhyanker |
| 2009/0064144 A1 | 3/2009 | Abhyanker |
| 2009/0069034 A1 | 3/2009 | Abhyanker |
| 2009/0070334 A1 | 3/2009 | Callahan et al. |
| 2009/0070435 A1 | 3/2009 | Abhyanker |
| 2009/0077100 A1 | 3/2009 | Hancock et al. |
| 2009/0102644 A1 | 4/2009 | Hayden |
| 2009/0119275 A1 | 5/2009 | Chen et al. |
| 2009/0132504 A1 | 5/2009 | Vegnaduzzo et al. |
| 2009/0132644 A1 | 5/2009 | Frishert et al. |
| 2009/0171950 A1 | 7/2009 | Lunenfeld |
| 2009/0177577 A1 | 7/2009 | Garcia |
| 2009/0177628 A1 | 7/2009 | Yanagisawa et al. |
| 2009/0228305 A1 | 9/2009 | Gustafsson et al. |
| 2009/0254971 A1 | 10/2009 | Herz et al. |
| 2009/0271417 A1 | 10/2009 | Toebes et al. |
| 2009/0271524 A1 | 10/2009 | Davi et al. |
| 2009/0282353 A1 | 11/2009 | Halbherr et al. |
| 2009/0284530 A1 | 11/2009 | Lester et al. |
| 2009/0287682 A1 | 11/2009 | Fujioka et al. |
| 2009/0299551 A1* | 12/2009 | So et al. ............................ 701/3 |
| 2010/0011081 A1 | 1/2010 | Crowley et al. |
| 2010/0023388 A1 | 1/2010 | Blumberg et al. |
| 2010/0024045 A1 | 1/2010 | Sastry et al. |
| 2010/0051740 A1 | 3/2010 | Yoeli |
| 2010/0057555 A1 | 3/2010 | Butterfield et al. |
| 2010/0064007 A1 | 3/2010 | Randall |
| 2010/0070075 A1 | 3/2010 | Chirnomas |
| 2010/0076966 A1 | 3/2010 | Strutton et al. |
| 2010/0077316 A1 | 3/2010 | Omansky et al. |
| 2010/0079338 A1 | 4/2010 | Wooden et al. |
| 2010/0082683 A1 | 4/2010 | Law et al. |
| 2010/0083125 A1 | 4/2010 | Zafar et al. |
| 2010/0088015 A1 | 4/2010 | Lee |
| 2010/0094548 A1 | 4/2010 | Tadman et al. |
| 2010/0100937 A1 | 4/2010 | Tran |
| 2010/0106731 A1 | 4/2010 | Cartmell et al. |
| 2010/0108801 A1 | 5/2010 | Olm et al. |
| 2010/0118025 A1 | 5/2010 | Smith et al. |
| 2010/0120422 A1 | 5/2010 | Cheung et al. |
| 2010/0138259 A1 | 6/2010 | Delk |
| 2010/0138318 A1 | 6/2010 | Chun |
| 2010/0191798 A1 | 7/2010 | Seefeld et al. |
| 2010/0198684 A1 | 8/2010 | Eraker et al. |
| 2010/0214250 A1 | 8/2010 | Gillespie et al. |
| 2010/0231383 A1 | 9/2010 | Levine et al. |
| 2010/0243794 A1 | 9/2010 | Jermyn |
| 2010/0255899 A1 | 10/2010 | Paulsen |
| 2010/0275033 A1 | 10/2010 | Gillespie et al. |
| 2010/0302359 A1 | 12/2010 | Adams et al. |
| 2010/0306016 A1 | 12/2010 | Solaro et al. |
| 2011/0001020 A1 | 1/2011 | Forgac |
| 2011/0015954 A1 | 1/2011 | Ward |
| 2011/0022540 A1 | 1/2011 | Stern et al. |
| 2011/0040681 A1 | 2/2011 | Ahroon |
| 2011/0040692 A1 | 2/2011 | Ahroon |
| 2011/0041084 A1 | 2/2011 | Karam |
| 2011/0061018 A1 | 3/2011 | Piratla et al. |
| 2011/0066588 A1 | 3/2011 | Xie et al. |
| 2011/0066648 A1 | 3/2011 | Abhyanker et al. |
| 2011/0078012 A1 | 3/2011 | Adamec |

(56) References Cited

U.S. PATENT DOCUMENTS

| | | |
|---|---|---|
| 2011/0078270 A1 | 3/2011 | Galli et al. |
| 2011/0082747 A1 | 4/2011 | Khan et al. |
| 2011/0087667 A1 | 4/2011 | Hutheesing |
| 2011/0093340 A1 | 4/2011 | Kramer et al. |
| 2011/0093498 A1 | 4/2011 | Lunt et al. |
| 2011/0099142 A1 | 4/2011 | Karjalainen et al. |
| 2011/0106658 A1 | 5/2011 | Britt |
| 2011/0112976 A1 | 5/2011 | Ryan et al. |
| 2011/0128144 A1 | 6/2011 | Baron, Sr. et al. |
| 2011/0131172 A1 | 6/2011 | Herzog et al. |
| 2011/0151898 A1 | 6/2011 | Chandra et al. |
| 2011/0163160 A1 | 7/2011 | Zini et al. |
| 2011/0174920 A1 | 7/2011 | Yoeli |
| 2011/0181470 A1 | 7/2011 | Qiu et al. |
| 2011/0184643 A1 | 7/2011 | Abhyanker |
| 2011/0202426 A1 | 8/2011 | Cretney et al. |
| 2011/0219318 A1 | 9/2011 | Abhyanker |
| 2011/0231268 A1 | 9/2011 | Ungos |
| 2011/0246258 A1 | 10/2011 | Cragun et al. |
| 2011/0256895 A1 | 10/2011 | Palin et al. |
| 2011/0258028 A1 | 10/2011 | Satyavolu et al. |
| 2011/0264692 A1 | 10/2011 | Kardell |
| 2011/0291851 A1 | 12/2011 | Whisenant |
| 2012/0023196 A1 | 1/2012 | Grayson et al. |
| 2012/0047102 A1 | 2/2012 | Petersen et al. |
| 2012/0047448 A1 | 2/2012 | Amidon et al. |
| 2012/0077523 A1 | 3/2012 | Roumeliotis et al. |
| 2012/0084289 A1 | 4/2012 | Hutheesing |
| 2012/0096098 A1 | 4/2012 | Balassanian |
| 2012/0123667 A1 | 5/2012 | Guéziec |
| 2012/0126974 A1 | 5/2012 | Phillips et al. |
| 2012/0138732 A1 | 6/2012 | Olm et al. |
| 2012/0163206 A1 | 6/2012 | Leung et al. |
| 2012/0166935 A1 | 6/2012 | Abhyanker |
| 2012/0191606 A1 | 7/2012 | Milne |
| 2012/0191797 A1 | 7/2012 | Masonis et al. |
| 2012/0209775 A1 | 8/2012 | Milne |
| 2012/0221470 A1 | 8/2012 | Lyon |
| 2012/0224076 A1 | 9/2012 | Niedermeyer et al. |
| 2012/0232958 A1 | 9/2012 | Silbert |
| 2012/0239483 A1 | 9/2012 | Yankovich et al. |
| 2012/0239520 A1 | 9/2012 | Lee |
| 2012/0246024 A1 | 9/2012 | Thomas et al. |
| 2012/0254774 A1 | 10/2012 | Patton |
| 2012/0259688 A1 | 10/2012 | Kim |
| 2012/0264447 A1 | 10/2012 | Rieger, III |
| 2012/0270567 A1 | 10/2012 | Johnson |
| 2012/0278743 A1 | 11/2012 | Heckman et al. |
| 2012/0331002 A1 | 12/2012 | Carrington |
| 2013/0005307 A1 | 1/2013 | Kim et al. |
| 2013/0024108 A1 | 1/2013 | Grün |
| 2013/0041761 A1 | 2/2013 | Voda |
| 2013/0041862 A1 | 2/2013 | Yang et al. |
| 2013/0054317 A1 | 2/2013 | Abhyanker |
| 2013/0055163 A1 | 2/2013 | Matas et al. |
| 2013/0068876 A1 | 3/2013 | Radu |
| 2013/0072114 A1 | 3/2013 | Abhyanker |
| 2013/0073375 A1 | 3/2013 | Abhyanker |
| 2013/0073474 A1 | 3/2013 | Young et al. |
| 2013/0080217 A1 | 3/2013 | Abhyanker |
| 2013/0103437 A1 | 4/2013 | Nelson |
| 2013/0105635 A1 | 5/2013 | Alzu'bi et al. |
| 2013/0110631 A1 | 5/2013 | Mitchell et al. |
| 2013/0151455 A1 | 6/2013 | Odom et al. |
| 2013/0159127 A1 | 6/2013 | Myslinski |
| 2013/0204437 A1 | 8/2013 | Koselka et al. |
| 2013/0254670 A1 | 9/2013 | Eraker et al. |
| 2013/0282842 A1 | 10/2013 | Blecon et al. |
| 2013/0297589 A1 | 11/2013 | Work et al. |
| 2013/0301405 A1 | 11/2013 | Fuste Vilella et al. |
| 2013/0303197 A1 | 11/2013 | Chandra et al. |
| 2013/0317999 A1 | 11/2013 | Zimberoff et al. |
| 2014/0032034 A1 | 1/2014 | Raptopoulos et al. |
| 2014/0040179 A1 | 2/2014 | Herzog et al. |
| 2014/0067167 A1 | 3/2014 | Levien et al. |
| 2014/0067704 A1 | 3/2014 | Abhyanker |
| 2014/0074736 A1 | 3/2014 | Carrington |
| 2014/0081450 A1 | 3/2014 | Kuehnrich et al. |
| 2014/0087780 A1 | 3/2014 | Abhyanker et al. |
| 2014/0095293 A1 | 4/2014 | Abhyanker |
| 2014/0100900 A1 | 4/2014 | Abhyanker |
| 2014/0108540 A1 | 4/2014 | Crawford |
| 2014/0108556 A1 | 4/2014 | Abhyanker |
| 2014/0108613 A1 | 4/2014 | Randall |
| 2014/0114866 A1 | 4/2014 | Abhyanker |
| 2014/0115671 A1 | 4/2014 | Abhyanker |
| 2014/0117147 A1 | 5/2014 | Hanna et al. |
| 2014/0123246 A1 | 5/2014 | Abhyanker |
| 2014/0123247 A1 | 5/2014 | Abhyanker |
| 2014/0130140 A1 | 5/2014 | Abhyanker |
| 2014/0135039 A1 | 5/2014 | Sartipi |
| 2014/0136328 A1 | 5/2014 | Abhyanker |
| 2014/0136414 A1 | 5/2014 | Abhyanker |
| 2014/0136624 A1 | 5/2014 | Abhyanker |
| 2014/0142848 A1 | 5/2014 | Chen et al. |
| 2014/0143061 A1 | 5/2014 | Abhyanker |
| 2014/0149244 A1 | 5/2014 | Abhyanker |
| 2014/0149508 A1 | 5/2014 | Middleton et al. |
| 2014/0164126 A1 | 6/2014 | Nicholas et al. |
| 2014/0165091 A1 | 6/2014 | Abhyanker |
| 2014/0172727 A1 | 6/2014 | Abhyanker et al. |
| 2014/0204360 A1 | 7/2014 | Dowski, Jr. et al. |
| 2014/0222908 A1 | 8/2014 | Park et al. |
| 2014/0254896 A1 | 9/2014 | Zhou et al. |
| 2014/0277834 A1 | 9/2014 | Levien et al. |
| 2014/0316243 A1 | 10/2014 | Niedermeyer |

FOREIGN PATENT DOCUMENTS

| | | |
|---|---|---|
| KR | 1020120121376 A | 7/2012 |
| WO | 9808055 A1 | 2/1998 |
| WO | 9956143 A1 | 11/1999 |
| WO | 0054170 A2 | 9/2000 |
| WO | 0163423 A1 | 8/2001 |
| WO | 0201455 A2 | 1/2002 |
| WO | 0219236 A1 | 3/2002 |
| WO | 0241115 A2 | 5/2002 |
| WO | 03058540 A1 | 7/2003 |
| WO | 2005103624 A2 | 11/2005 |
| WO | 2006020471 A1 | 2/2006 |
| WO | 2007108927 A2 | 9/2007 |
| WO | 2007108928 A2 | 9/2007 |
| WO | 2007113844 A1 | 10/2007 |
| WO | 2008103149 A1 | 8/2008 |
| WO | 2008105766 A1 | 9/2008 |
| WO | 2008108772 A1 | 9/2008 |
| WO | 2008118119 A1 | 10/2008 |
| WO | 2008123851 A1 | 10/2008 |
| WO | 2008111929 A3 | 11/2008 |
| WO | 2009138559 A1 | 11/2009 |
| WO | 2010103163 A1 | 9/2010 |
| WO | 2013188762 A1 | 12/2013 |
| WO | 2014121145 A1 | 8/2014 |

OTHER PUBLICATIONS http://www.remax.com/advancedsearch/.
http://global.remax.com/AdvancedListingSearch.aspx.
http://www.magicbricks.com/property-requirement-to-buy-rent/residential-commercial.
http://www.mapmyindia.com/solutions/tracking-lbs/vehicle-tracking.
http://www.mapmyindia.com/solutions/tracking-lbs/asset-tracking.
http://www.mapmyindia.com/solutions/enterprises/geo-tagging.
http://www.zillow.com/.
http://www.zillow.com/homes/for_rent/.
http://www.zillow.com/homes/for_sale/days_sort/53.409532,-64.072266,19.352611,-129.550781_rect/3_zm/.
http://www.trulia.com/home_prices/.
http://www.trulia.com/for_rent/New_York,NY.
http://www.realtor.com/rentals.
http://www.realtor.com/realestateforsale.

(56) References Cited

OTHER PUBLICATIONS http://www.househunt.com/.
http://www.coldwellbanker.com/real_estate_search;jsessionid=S8ok3kaZtBh5GKHoo-Yzo28Z.sky-node04.
http://www.switchboard.com/.
http://www.anywho.com/whitepages.
http://wp.superpages.com/.
http://www.whitepages.com/.
http://www-personal.umich.edu/~ladamic/papers/socialsearch/adamicsocialsearch.pdf.
http://cs.wellesley.edu/~cs315/315_PPTs/L19-SocialNetworks/Stuff/wellesley.pdf.
http://citeseerx.ist.psu.edu/viewdoc/download?doi=10.1.1.98.5230&rep=rep1&type=pdf.
http://www.ece.Isu.edu/xinli/Research/HeatMap_TVCG06.pdf.
http://www.usa-people-search.com/.
https://www.i-neighbors.org/.
"Friends and Neighbors on the Web", 2001 by Lada A. Adamic et al. (pp. 9) http://www.hpl.hp.com/research/idl/papers/web10/fnn2.pdf.
"A social influence model of consumer participation in network- and small-group-based virtual communities", International Journal of Research in Marketing, 2004 by Utpal M, Dholakia et al. (pp. 23) http://www-bcf.usc.edu/~douglast/620/bettina1.pdf.
"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.
"Direct Annotation: A Drag-and-Drop Strategy for Labeling Photos", University of Maryland, 2000 by Ben Shneiderman et al. (Pages 8) http://hcil2.cs.umd.edu/trs/2000-06/2000-06.pdf.
"Notification for Shared Annotation of Digital Documents", Technical Report MSR-TR-2001-87, Sep. 19, 2001 by A. J. Bernheim Brush et al. (Pages 9) http://research.microsoft.com/pubs/69880/tr-2001-87.pdf.
"HT06, Tagging Paper, Taxonomy, Flickr, Academic Article, ToRead", Yahoo Research Berkeley, CA, 2006 by Cameron Marlow et al. (Pages 9) http://www.danah.org/papers/Hypertext2006.pdf.
"ChipIn—the easy way to collect money", Louis' Really Useful Finds, Mar. 12. (Page 1) http://reallyusefulthings.tumblr.com/post/28688782/chipin-the-easy-way-to-collect-money.
Benchmark-Backed Nextdoor Launches as a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-for-neighborhoods/.
Fatdoor Founder Sues Benchmark Capital, Saying it Stole His Idea for Nextdoor, All Things Digital Article, Nov. 11, 2011, by Liz Gannes (7 Pages) http://allthingsd.com/20111111/fatdoor-founder-sues-benchmark-capital-saying-it-stole-his-idea-for-nextdoor/.
Fatdoor CEO Talks About Balancing Security with Community, Wired Magazine, May 31, 2007, by Terrence Russell (2 Pages) http://www.wired.com/2007/05/fatdoor_ceo_tal/.
Fatdoor Launches Social Network for Your Neighborhood, Mashable Article, May 28, 2007, by Kristen Nicole (3 Pages) http://mashable.com/2007/05/28/fatdoor/.
Screenshots of Nextdoor website and its features—as submitted in Case5:14-cv-02335-BLF on Jul. 15, 2014 (pp. 19) http://www.nextdoor.com/.
Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.
Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.
Frontporchforum.screenshots. Jul. 19, 2006 webarchive.org 1-15 (herein FrontPorch) (pp. 15).
Fatdoor where 2.0 Launch Coverage Report, Jun. 21, 2007, by Sterling Communications (pp. 24).
Screenshot of Fatdoor on Wikipedia, Apr. 12, 2007 (p. 1).
Case No. 5-14-cv-02335-BLF Complaint *Fatdoor* v. *Nextdoor*, Northern District of California, with Exhibits A, B and C {Part 1 (pp. 258)} and Exhibits D, E, F, G and H {Part 2 (pp. 222)}, Jul. 15, 2014.
Expert Report—Forensics of Jon Berryhill, Report, *Nextdoor* v. *Abhyanker*, Aug. 8, 2014, by Berryhill Computer forensics Inc. (pp. 23).
Case No. 3:12-cv-05667-EMC Complaint *Nextdoor* v. *Abhyanker*, Northern District of California, Nov. 5, 2012 (pp. 46).
Expert Report—Patent of Jeffrey G. Sheldon, *Nextdoor* v. *Abhyanker*, Aug. 8, 2014 (pp. 7).
Exhibits of Expert Report—Patent of Jeffrey G. Sheldon, *Nextdoor* v. *Abhyanker*, with Attachments A, B, C, D and E (1/2) {Part 1 (pp. 46)} and Attachments E (2/2) and F {Part 2 (pp. 41)}.
Case No. 111-CV-212924 *Abhyanker* v. *Benchmark Capital Partners L.P.*, Superior Court of California, County of Santa Clara, Nov. 10, 2011 (pp. 78). http://www.scribd.com/doc/72441873/Stamped-COMPLAINT-Abhyanker-v-Benchmark-Capital-Et-Al-FILED-PUBLIC.
Neighbors Stop Diaper and Formula Thief in his Tracks, Nextdoor Blog, Aug. 15, 2014, by Anne Dreshfield (pp. 12) http://blog.nextdoor.com/.
Screenshot of Fatdoor website with its features—Aug. 21, 2014 (pp. 6) http://www.fatdoor.com/.
Screenshot of AirBnB website with its features—Aug. 21, 2014 (pp. 4)http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, Complaint *Fatdoor, Inc.* v. *IP Analytics LLC and Google Inc.*,Northern District of California, Aug. 25, 2014, (pp. 16).
Screenshot of Meetey on CrunchBase, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on Crunch Base, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry The Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).
Wikipedia entry Google Maps website—Aug. 27, 2014 (p. 18) http://en.wikipedia.org/wiki/Google_Maps.
Screenshot of Facebook website for groups, Aug. 27, 2014, (p. 1) https://www.facebook.com/about/groups.
Facebook Engineers bring Google+ Circles to Facebook, Article on ZDNet by Emil Protalinski, Jul. 3, 2011, (pp. 2) http://www.zdnet.com/blog/facebook/facebook-engineers-bring-google-circles-to-facebook/1885.

(56) References Cited

OTHER PUBLICATIONS

Screenshot of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.
"Crowdsourcing: Those that are willing to test & learn will be those that will win", Newsline, Mar. 1, 2011 by Neil Perkin http://mediatel.co.uk/newsline/2011/03/01/crowdsourcing-those-that-are-willing-to-test-learn-will-be-those-that-will-win/.

* cited by examiner

COORDINATION OF AERIAL VEHICLES THROUGH A CENTRAL SERVER

CLAIMS OF PRIORITY

This patent application is a continuation in part, claims priority from, and hereby incorporates by reference and claims priority from the entirety of the disclosures of the following cases and each of the cases on which they depend and further claim priority or incorporate by reference:
  (1) U.S. Continuation-in-Part patent application Ser. No. 14/321,817, titled 'NEXTDOOR NEIGHBORHOOD SOCIAL NETWORK METHOD, APPARATUS, AND SYSTEM' filed on Jul. 2, 2014 and which itself is a Continuation-in-Part application of:
    U.S. Continuation-in-Part patent application Ser. No. 14/203,531, titled 'GEO-SPATIALLY CONSTRAINED PRIVATE NEIGHBORHOOD SOCIAL NETWORK' filed on Mar. 10, 2014, and now issued as U.S. Pat. No. 8,775,328 on Jul. 8, 2014, and which further depends on:
      a. U.S. Continuation-in-Part patent application Ser. No. 11/653,194 titled 'LODGING AND REAL PROPERTY IN A GEO-SPATIAL MAPPING ENVIRONMENT' filed on Jan. 12, 2007,
      b. U.S. Utility patent application Ser. No. 11/603,442 titled 'MAP BASED NEIGHBORHOOD SEARCH AND COMMUNITY CONTRIBUTION' filed on Nov. 22, 2006,
      c. U.S. Provisional patent application 60/853,499 filed on Oct. 19, 2006, and 60/854,230 filed on Oct. 25, 2006.
  (2) U.S. Utility patent application Ser. No. 14/142,763 titled 'AUTOMOBILE SHARING BY USERS OF A NEIGHBORHOOD SOCIAL NETWORK USING A RADIAL ALGORITHM', filed on Dec. 28, 2013.
  3) U.S. Utility patent application Ser. No. 14/207,679 titled 'PEER-TO-PEER NEIGHBORHOOD DELIVERY MULTI-COPTER AND METHOD', filed on Mar. 13, 2014.
  4) U.S. Utility patent application Ser. No. 14/261,405 titled 'SKYTEBOARD QUADCOPTER AND METHOD', filed on Apr. 24, 2014.

FIELD OF TECHNOLOGY

This disclosure relates generally to the technical fields of communications, more particularly, to the coordination of aerial vehicles through a central server.

BACKGROUND

Aerial vehicles may be limited in what they are able to accomplish independently. It may be difficult and/or impractical to operate multiple independent aerial vehicles in the same air space and/or to attempt to have independent aerial vehicles accomplish a single task. As a result, the application of aerial vehicles may be limited and/or opportunities for advancement and/or gain may be foregone.

SUMMARY

Disclosed are a method, a device and/or a system of coordination of aerial vehicles through a central server. In one aspect, a system includes a central server and an Internet protocol network. A first aerial vehicle is communicatively coupled with the central server through the Internet protocol network. A second aerial vehicle is communicatively coupled with the first aerial vehicle when a command is transferred through the central server using the Internet protocol network. A first computing device of a first user of the first aerial vehicle operatively controls the first aerial vehicle through the first computing device through the Internet protocol network. A second computing device of a second user of the second aerial vehicle operatively controls the second aerial vehicle through the second computing device through the Internet protocol network. The first computing device of the first user and/or the second computing device of the second user communicate the command to the first aerial vehicle through the central server.

A communication logic block may communicate a current geo-spatial location and/or an altitude data of the first aerial vehicle to the central server when the first aerial vehicle is hovering at the current geo-spatial location for at least a threshold amount of time. The threshold amount of time may be approximately two seconds of time. The command communicated by the second computing device of the second user to the first aerial vehicle through the central server may be a set of instructions that instruct any of the first computing device, the first aerial vehicle, and/or the second aerial vehicle that the second aerial vehicle is to position itself in an adjacent manner in relation to the first aerial vehicle at a threshold distance away that is to a left to the first aerial vehicle, to a right of the first aerial vehicle, to a front of the first aerial vehicle, and/or to a rear of the first aerial vehicle.

The first computing device may include an undo function to maneuver the first aerial vehicle in flight to a last previously saved geo-spatial location of the first aerial vehicle based on a last previous location of the first aerial vehicle stored in the central server when the undo function is initiated. A turn-and-face logic block may maneuver the second aerial vehicle in a semicircular rotation from the first aerial vehicle such that the second aerial vehicle is facing the first aerial vehicle through first person view cameras of both the first aerial vehicle and the second aerial vehicle when the command instructs a turn-and-face operation. A back-up logic block may back the second aerial up a distance away while maintaining the altitude of the first aerial vehicle through the central server when in the semi-circularly rotated state of the second aerial vehicle.

The threshold distance away may be based on an accuracy of aerial geo-spatial coordinates of the first aerial vehicle and/or the second aerial vehicle. A no-fly logic block may create a no-fly zone between the first aerial vehicle and the second aerial vehicle based on the threshold distance. The first aerial vehicle and/or the second aerial vehicle may have an attachment through which a payload weight is transportable. A follow-the-leader logic block may designate the first aerial vehicle as a master aerial vehicle and/or the second aerial vehicle as a slave aerial vehicle, such that an aeronautical maneuver of the master aerial vehicle is mirrored by the slave aerial vehicle at an equivalent displacement in a three dimensional space while maintaining a separation in the no-fly zone between the first aerial vehicle and the second aerial vehicle.

A group of at least two aerial vehicles may carry a combined payload equivalent to proportionally an addition of the payload weight of individual aerial vehicles forming the group of at least two aerial vehicles. The combined payload may be an outdoor sign that is liftable by a tethering of individual ones of the aerial vehicles through a coupling mechanism that attach locations of the outdoor sign with each of the aerial vehicles forming the group of at least two aerial vehicles. The combined payload may be a flood lighting that is liftable by the tethering of individual ones of the group of at least two aerial vehicles through the coupling mechanism that attaches an assembly of the flood lighting with each of the aerial vehicles forming the group of at least two aerial vehicles.

The first user and/or the second user may be communicatively coupled to each other through a neighborhood social network. The first user may be connected to the second user in the neighborhood social network prior to the second computing device of the second user communicating the command to the first aerial vehicle through the central server. The first computing device and/or the second computing device may be a mobile device and/or a desktop computer. The first aerial vehicle may include an intelligent emergency function in which rotors of the first aerial vehicle shut-down power when a landing command provided by the first computing device fails to reduce altitude of the first aerial vehicle at an expected rate of descent.

A peer-to-peer logic block may enable the first aerial vehicle and/or the second aerial vehicle to also directly communicate (e.g., without use of the central server) with each other in-flight through an ad-hoc local area network formed between the first aerial vehicle and the second aerial vehicle. An assumption logic block may automatically assume a previous geo-spatial location and/or a previous altitude of the first aerial vehicle when the first aerial vehicle indicates that a remaining battery power of the first aerial vehicle is below a threshold level based on a take-over function authorized by the first user and/or communicated to the second user through the Internet protocol network using the central server and/or the ad-hoc local area network between the first aerial vehicle and/or the second aerial vehicle.

In another aspect, a method includes communicatively coupling a first aerial vehicle with a central server through an Internet protocol network and communicatively coupling a second aerial vehicle with the first aerial vehicle when a coordination command is transferred through the central server using the Internet protocol network. A first computing device of a first user of the first aerial vehicle operatively controls the first aerial vehicle through the first computing device through the Internet protocol network. A second computing device of a second user of the second aerial vehicle operatively controls the second aerial vehicle through the second computing device through the Internet protocol network. The first computing device of the first user and/or the second computing device of the second user communicate the coordination command to the first aerial vehicle through the central server.

In yet another aspect, a system includes a central server and an Internet protocol network. A first aerial vehicle is communicatively coupled with the central server through the Internet protocol network. A second aerial vehicle is communicatively coupled with the first aerial vehicle when a command is transferred through the central server using the Internet protocol network. A first computing device of a first user of the first aerial vehicle operatively controls the first aerial vehicle through the first computing device through the Internet protocol network. A second computing device of a second user of the second aerial vehicle operatively controls the second aerial vehicle through the second computing device through the Internet protocol network. The first computing device of the first user and/or the second computing device of the second user to communicate a coordination command to the first aerial vehicle through the central server. A communication logic block communicates a current geo-spatial location and an altitude data of the first aerial vehicle to the central server when the first aerial vehicle is hovering at the current geo-spatial location for at least a threshold amount of time. The threshold amount of time is at least approximately two seconds of time.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
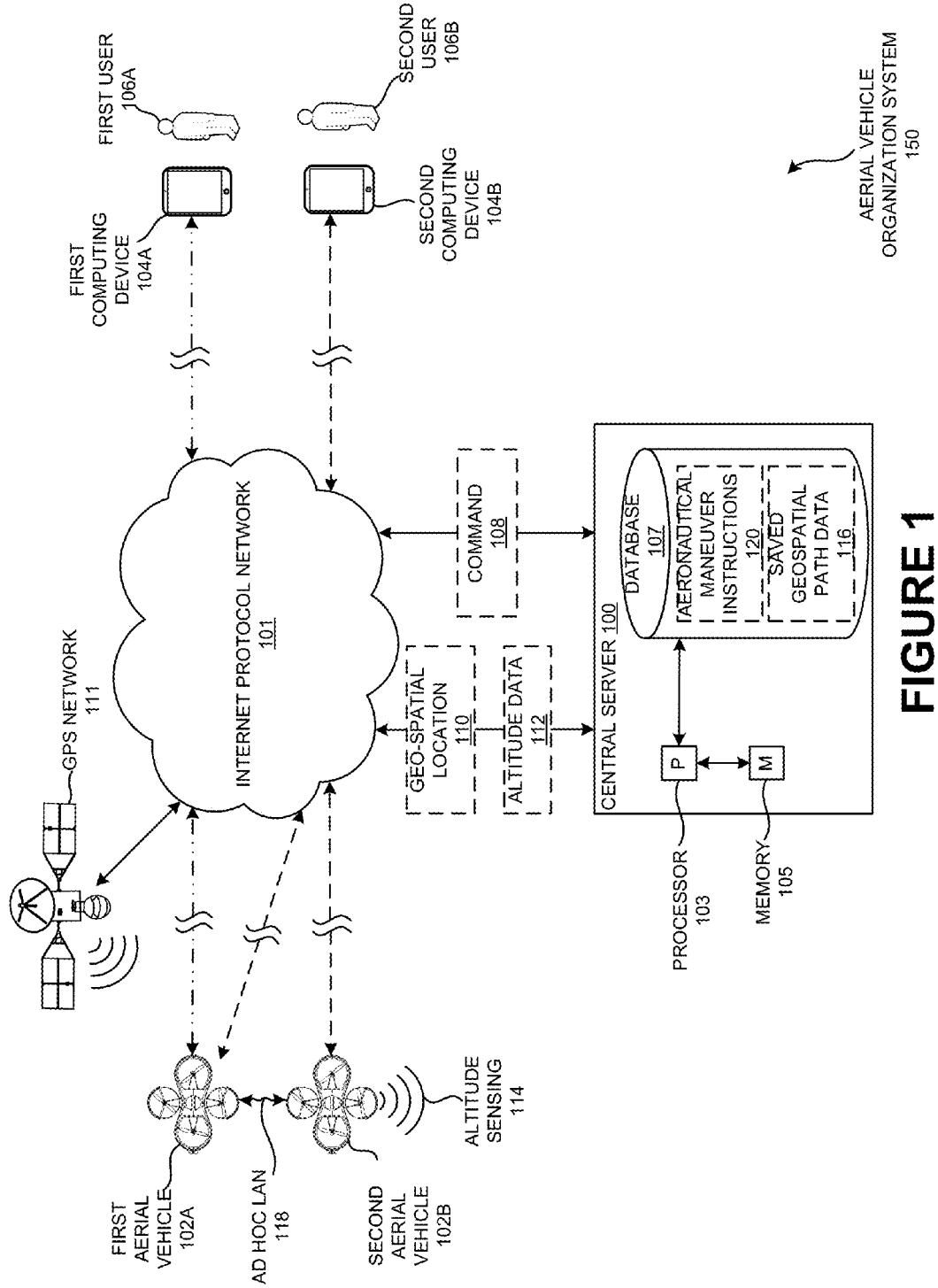
FIG. 1 is a view of an aerial vehicle organization system showing aerial vehicles communicatively coupled with a central server through an Internet protocol network, according to one embodiment.

Other features of the present embodiments will be apparent from the accompanying drawings and from the detailed description that follows.

DETAILED DESCRIPTION

A method, apparatus and system of coordinated aerial vehicles through a central server are disclosed. In the following description, for the purposes of explanation, numerous specific details are set forth in order to provide a thorough understanding of the various embodiments. It will be evident, however to one skilled in the art that the various embodiments may be practiced without these specific details.

Disclosed are a method, a device and/or a system of coordination of aerial vehicles through a central server 100. In one embodiment, a system includes a central server 100 and an Internet protocol network 101. A first aerial vehicle 102A is communicatively coupled with the central server 100 through the Internet protocol network 101. A second aerial vehicle 102B is communicatively coupled with the first aerial vehicle 102A when a command 108 is transferred through the central server 100 using the Internet protocol network 101. A first computing device 104A of a first user 106A of the first aerial vehicle 102A operatively controls the first aerial vehicle 102A through the first computing device 104A through the Internet protocol network 101. A second computing device 104B of a second user 106B of the second aerial vehicle 102B operatively controls the second aerial vehicle 102B through the second computing device 104B through the Internet protocol network 101. The first computing device 104A of the first user 106A and/or the second computing device 104B of the second user 106B communicate the command 108 to the first aerial vehicle 102A through the central server 100.

A communication logic block 202 may communicate a current geo-spatial location 110 and/or an altitude data 112 of the first aerial vehicle 102A to the central server 100 when the first aerial vehicle 102A is hovering at the current geo-spatial location 110 for at least a threshold amount of time. The threshold amount of time may be approximately two seconds of time. The command 108 communicated by the second computing device 104B of the second user 106B to the first aerial vehicle 102A through the central server 100 may be a set of instructions that instruct any of the first computing device 104A, the first aerial vehicle 102A, and/or the second aerial vehicle 102B that the second aerial vehicle 102B is to position itself in an adjacent manner in relation to the first aerial vehicle 102A at a threshold distance 500 away that is to a left to the first aerial vehicle 102A, to a right of the first aerial vehicle 102A, to a front of the first aerial vehicle 102A, and/or to a rear of the first aerial vehicle 102A.

The first computing device 104A may include an undo function 806 to maneuver the first aerial vehicle 102A in flight to a last previously saved geo-spatial location 110 of the first aerial vehicle 102A based on a last previous location of the first aerial vehicle 102A stored in the central server 100 when the undo function 806 is initiated. A turn-and-face logic block 206 may maneuver the second aerial vehicle 102B in a semicircular rotation from the first aerial vehicle 102A such that the second aerial vehicle 102B is facing the first aerial vehicle 102A through first person view camera 604s of both the first aerial vehicle 102A and the second aerial vehicle 102B when the command 108 instructs a turn-and-face operation. A back-up logic block 208 may back the second aerial up a distance away while maintaining the altitude of the first aerial vehicle 102A through the central server 100 when in the semi-circularly rotated state of the second aerial vehicle 102B.

The threshold distance 500 away may be based on an accuracy of aerial geo-spatial coordinates of the first aerial vehicle 102A and/or the second aerial vehicle 102B. A no-fly logic block 212 may create a no-fly zone 501 between the first aerial vehicle 102A and/or the second aerial vehicle 102B based on the threshold distance 500. The first aerial vehicle 102A and/or the second aerial vehicle 102B may have an attachment through which a payload weight is transportable. A follow-the-leader logic block 210 may designate the first aerial vehicle 102A as a master aerial vehicle and/or the second aerial vehicle 102B as a slave aerial vehicle, such that an aeronautical maneuver of the master aerial vehicle is mirrored by the slave aerial vehicle at an equivalent displacement in a three dimensional space while maintaining a separation in the no-fly zone 501 between the first aerial vehicle 102A and the second aerial vehicle 102B.

A group of at least two aerial vehicles may carry a combined payload 1000 equivalent to proportionally an addition of the payload weight of individual aerial vehicles forming the group of at least two aerial vehicles. The combined payload 1000 may be an outdoor sign that is liftable by a tethering of individual ones of the aerial vehicles through a coupling mechanism 1002 that attach locations of the outdoor sign with each of the aerial vehicles forming the group of at least two aerial vehicles. The combined payload 1000 may be a flood lighting that is liftable by the tethering of individual ones of the group of at least two aerial vehicles through the coupling mechanism 1002 that attaches an assembly of the flood lighting with each of the aerial vehicles forming the group of at least two aerial vehicles.

The first user 106A and/or the second user 106B may be communicatively coupled to each other through a neighborhood social network 1100. The first user 106A may be connected to the second user 106B in the neighborhood social network 1100 prior to the second computing device 104B of the second user 106B communicating the command 108 to the first aerial vehicle 102A through the central server 100. The first computing device 104A and/or the second computing device 104B may be a mobile device and/or a desktop computer. The first aerial vehicle 102A may include an intelligent emergency function in which rotors of the first aerial vehicle 102A shut-down power when a landing command 108 provided by the first computing device 104A fails to reduce altitude of the first aerial vehicle 102A at an expected rate of descent.

A peer-to-peer logic block 204 may enable the first aerial vehicle 102A and/or the second aerial vehicle 102B to also directly communicate with each other in-flight through an ad-hoc local area network formed between the first aerial vehicle 102A and the second aerial vehicle 102B. An assumption logic block 214 may automatically assume a previous geo-spatial location 110 and/or a previous altitude of the first aerial vehicle 102A when the first aerial vehicle 102A indicates that a remaining battery power of the first aerial vehicle 102A is below a threshold level based on a take-over function authorized by the first user 106A and/or communicated to the second user 106B through the Internet protocol network 101 using the central server 100 and/or the ad-hoc local area network between the first aerial vehicle 102A and/or the second aerial vehicle 102B.

In another embodiment, a method includes communicatively coupling a first aerial vehicle 102A with a central server 100 through an Internet protocol network 101 and communicatively coupling a second aerial vehicle 102B with the first aerial vehicle 102A when a coordination command 108 is transferred through the central server 100 using the Internet protocol network 101. A first computing device 104A of a first user 106A of the first aerial vehicle 102A operatively controls the first aerial vehicle 102A through the first computing device 104A through the Internet protocol network 101. A second computing device 104B of a second user 106B of the second aerial vehicle 102B operatively controls the second aerial vehicle 102B through the second computing device 104B through the Internet protocol network 101. The first computing device 104A of the first user 106A and/or the second computing device 104B of the second user 106B communicate the coordination command 108 to the first aerial vehicle 102A through the central server 100.

In yet another embodiment, a system includes a central server 100 and an Internet protocol network 101. A first aerial vehicle 102A is communicatively coupled with the central server 100 through the Internet protocol network 101. A second aerial vehicle 102B is communicatively coupled with the first aerial vehicle 102A when a command 108 is transferred through the central server 100 using the Internet protocol network 101. A first computing device 104A of a first user 106A of the first aerial vehicle 102A operatively controls the first aerial vehicle 102A through the first computing device 104A through the Internet protocol network 101. A second computing device 104B of a second user 106B of the second aerial vehicle 102B operatively controls the second aerial vehicle 102B through the second computing device 104B through the Internet protocol network 101. The first computing device 104A of the first user 106A and/or the second computing device 104B of the second user 106B to communicate a coordination command 108 to the first aerial vehicle 102A through the central server 100. A communication logic block 202 communicates a current geo-spatial location 110 and an altitude data 112 of the first aerial vehicle 102A to the central server 100 when the first aerial vehicle 102A is hovering at the current geo-spatial location 110 for at least a threshold amount of time. The threshold amount of time is at least approximately two seconds of time.

FIG. 1 is a view of an aerial vehicle organization system 150 showing aerial vehicles communicatively coupled with a central server 100 through an Internet protocol network 101, according to one embodiment. In particular, FIG. 1 shows a central server 100, an Internet protocol network 101, a first aerial vehicle 102A, a second aerial vehicle 102B, a processor 103, a first computing device 104A, a second computing device 104B, a memory 105, a first user 106A, a second user 106B, a database 107, a command 108, a geo-spatial location 110, a GPS network 111, an altitude data 112, an altitude sensing 114, a saved geospatial path data 116, an ad hoc LAN 118, and an aeronautical maneuver instructions 120. In one embodiment, the central server 100 may be communicatively coupled with the first aerial vehicle 102A and/or the second aerial vehicle 102B through the Internet protocol network 101. The Internet protocol network 101 may be a wide area network.

The first computing device 104A of the first user 106A of the first aerial vehicle 102A (e.g., the computing device controlling the first aerial vehicle 102A) may be communicatively coupled with the first aerial vehicle 102A through the central server 100 (e.g., through wifi, a cellular network (e.g., 3G) and/or the Internet protocol network 101). The second computing device 104B of the second user 106B of the second aerial vehicle 102B may be communicatively coupled with the second aerial vehicle 102B through the central server 100 and/or the Internet protocol network 101. The first computing device 104A and/or second computing device 104B may communicate the command 108 to the first aerial vehicle 102A and/or second aerial vehicle 102B through the central server 100 and/or the Internet protocol network 101. The computing device may be communicatively coupled with the aerial vehicle(s) through a centralized configuration (e.g., through the central server 100 (e.g., using the Internet protocol network and/or the cellular network)) and/or a decentralized configuration (e.g., directly through the Internet protocol network 101).

In one embodiment, the command 108 may instruct any of the aerial vehicles (e.g., the first aerial vehicle 102A, the second aerial vehicle 102B and/or an Nth aerial vehicle) and/or computing devices to instruct the aerial vehicle(s) to position itself and/or one or more of the aerial vehicles in a particular position (e.g., a global positioning coordinate, a position in the sky and/or a position in relation to one or more other aerial vehicles). In one embodiment, the command 108 (e.g., a coordination command) may instruct the central server 100 to generate a set of instructions, using the processor 103 coupled with the memory 105, to instruct the second aerial vehicle 102B to position itself in an adjacent position 300 (e.g., the adjacent manner) to the first aerial vehicle 102A. In one embodiment, the adjacent manner may be to a left of the first aerial vehicle 102A (e.g., the left position), to a right of the first aerial vehicle 102A (e.g., the right position 302), to a front of the first aerial vehicle 102A (e.g., the front position 300), to a rear of the first aerial vehicle 102A (e.g., the back position), above the first aerial vehicle 102A, and/or below the first aerial vehicle 102A.

In one embodiment, the first aerial vehicle 102A and/or the second aerial vehicle 102B (while this disclosure mentions a first and second aerial vehicle, it will be appreciated that the methods and systems described herein may include any number of aerial vehicles) may periodically communicate its current geo-spatial location and/or altitude data 112 to the central server 100 through the Internet protocol network 101. In one embodiment, the aerial vehicle (e.g., a quadcopter, a helicopter, a multi-rotor copter, a fixed wing aerial vehicle, and/or an engine propelled aerial vehicle) may communicate at least one of the current geo-spatial location (e.g., the geo-spatial location 110) and/or altitude data 112 (e.g., altitude data captured using an altitude sensing 114 means) when the aerial vehicle has hovered in the current geo-spatial location 110 for a threshold amount of time (e.g., two seconds). In one embodiment, the communicated geo-spatial locations 110 and/or altitude data 112 may be stored in the database 107 (e.g., saved as geospatial path data 116). The saved geospatial path data 116 may enable the aerial vehicle(s) to execute an undo command 108. The database 107 may include aeronautical maneuver instructions 120 that may instruct the aerial vehicle(s) to execute maneuvers (e.g., the turn-and-face operation of FIG. 6 and/or an undo function 806). The central server 100 may use the processor 103, memory 105, and/or information from the database 107 to generate a set of instructions and/or instruct at least one of the first aerial vehicle 102A, the second aerial vehicle 102B, and/or an Nth aerial vehicle to fulfill an instruction set dictated by the command 108. In one embodiment, the processor 103 may be communicatively coupled with the memory 105. The processor 103 and/or memory 105 may work in concert with a sensory fusion algorithm and/or sensors of the aerial vehicle to enable and/or instruct the aerial vehicle to travel and/or maneuver autonomously and/or execute commands generated by the central server 100. The memory 105 and processor 103 may work in concert to select a master and/or slave aerial vehicle from a group of aerial vehicles and/or generate a set of instructions from the command 108.

A user (e.g., first user 106A) may need to request permission to control and/or coordinate with the aerial vehicle of another user (e.g., the second user 106B) before sending commands 108 to be executed by the aerial vehicle of the another user (e.g., in order to coordinate aerial vehicles). The another user may be required to grant permission to the user (e.g., the first user 106A) before the user may send commands 108 to be executed by the other aerial vehicle (e.g., the second aerial vehicle 102B). In one embodiment, the first user 106A may need to request to be a leader (e.g., to have the first aerial vehicle 102A as a master aerial vehicle that the second aerial vehicle 102B (e.g., the aerial vehicle of another user) follows and/or takes commands 108 from). The first user 106A may be able to send the command 108 instructing the second aerial vehicle 102B to execute a maneuver and/or act as a slave to the first aerial vehicle 102A (e.g., mimic movements and/or positions of the first aerial vehicle 102A) upon an acceptance of a request to coordinate and/or control.

In one embodiment, aerial vehicles of a set of aerial vehicles (e.g., the first aerial vehicle 102A, the second aerial vehicle 102B, aerial vehicles operating in a certain area, and/or aerial vehicles with users who have approved coordinated activities) may be able to establish peer-to-peer communication through ad-hoc local area networks (e.g., ad hoc LAN 118). When operating in the decentralized configuration, the aerial vehicles may be able to communicate using the ad hoc LAN 118. A master aerial vehicle may be able to communicate, using the ad hoc LAN 118, with the slave aerial vehicle in order to coordinate movements, flight paths, and/or communicate instructions.

Figure 4:
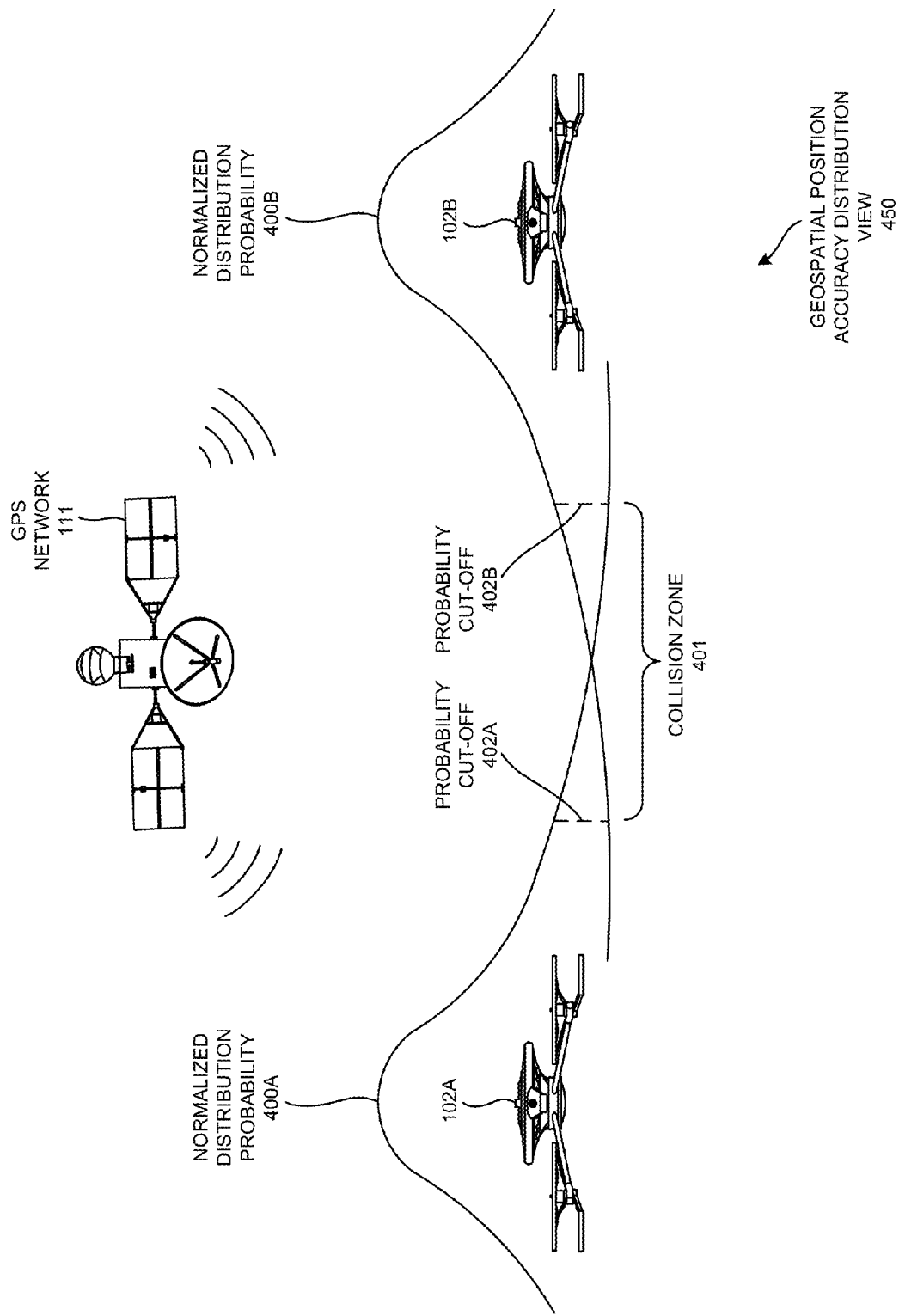
FIG. 4 is a geospatial position accuracy distribution view of the probability cut-off of two aerial vehicles, according to one embodiment.
Figure 5:
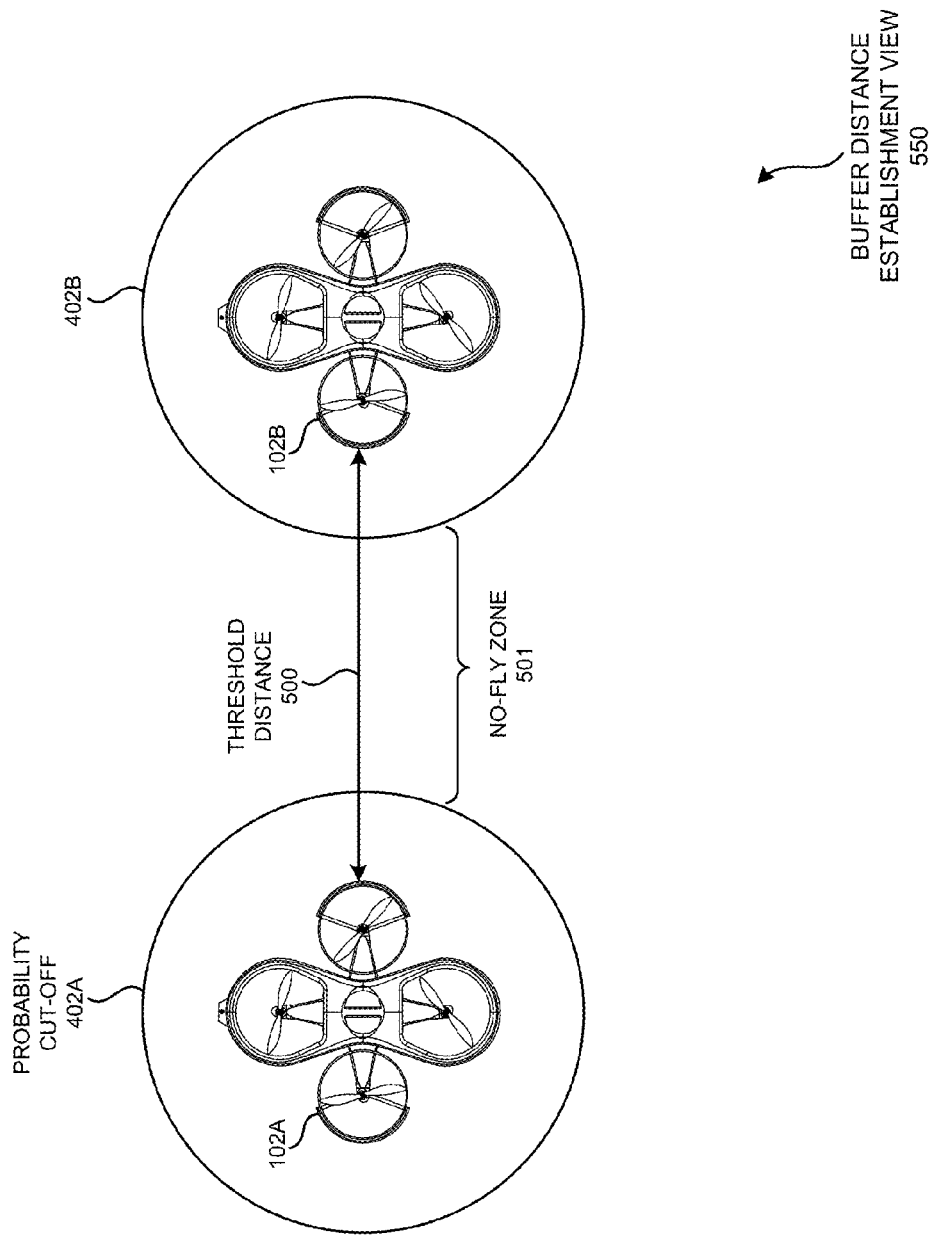
FIG. 5 is a buffer distance establishment view of a threshold distance and a no-fly zone between two aerial vehicles, according to one embodiment.

The GPS network 111 may enable the computing device (e.g., the first computing device 104A), the central server 100, and/or the aerial vehicle (e.g., the first aerial vehicle 102A) to know the current location of the aerial vehicle. In one embodiment the GPS network 111 may capture and/or send the geo-spatial location 110 to the central server 100. GPS devices of the aerial vehicle and/or the GPS network 111 associated therewith may have varying degrees of accuracy, especially in regards to moving objects. The GPS network 111 is best illustrated in FIGS. 4-5 and accompanying descriptions.

Figure 2:
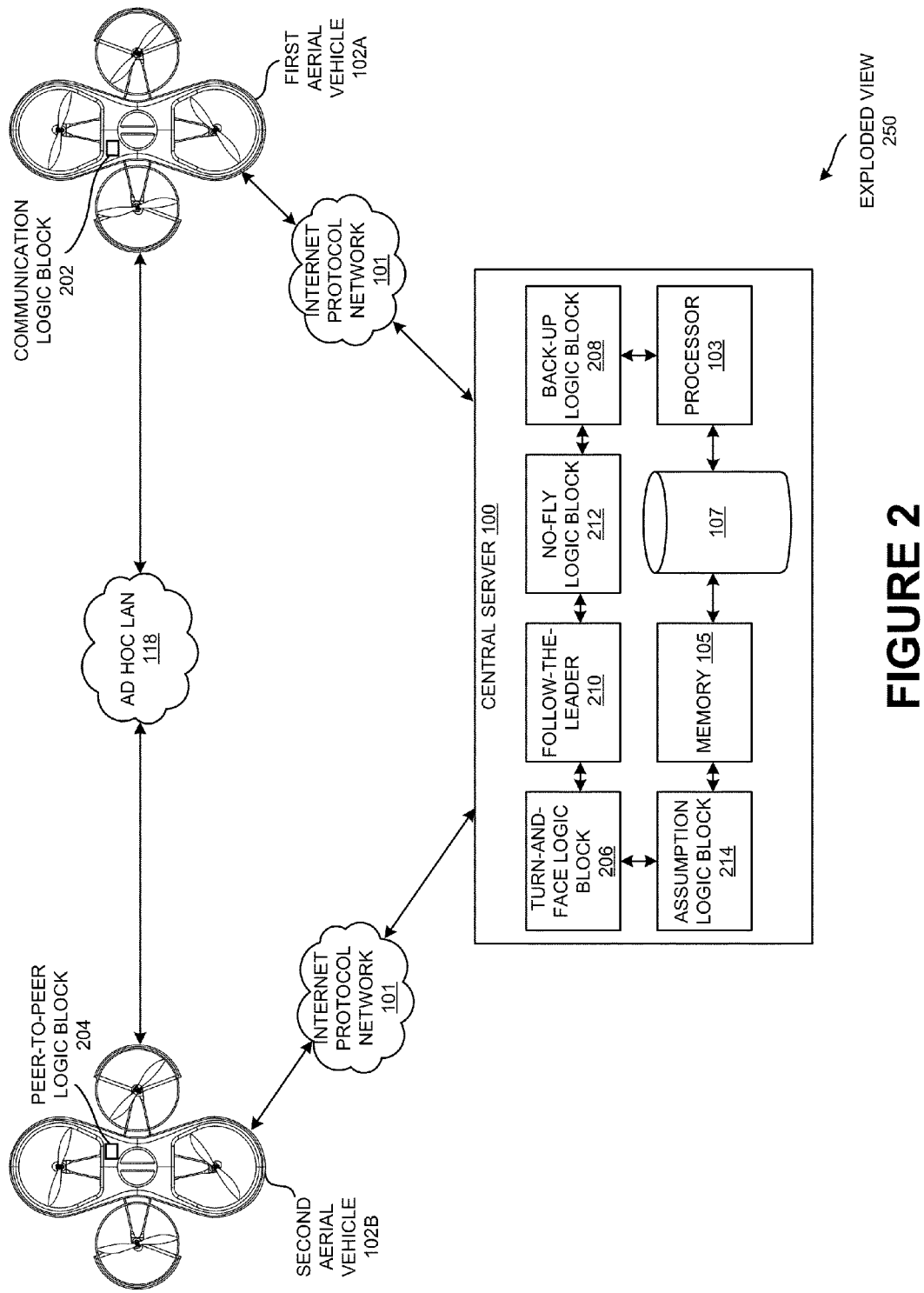
FIG. 2 is an exploded view of the central server, the first aerial vehicle, and the second aerial vehicle, according to one embodiment.

FIG. 2 is an exploded view 250 of the central server, the first aerial vehicle, and the second aerial vehicle, according to one embodiment. In particular, FIG. 2 shows a communication logic block 202, a peer-to-peer logic block 204, a turn-and-face logic block 206, a back-up logic block 208, a follow-the-leader logic block 210, a no-fly logic block 212, and an assumption logic block 214. The communication logic block 202 may send the geo-spatial location 110 and/or altitude data 112 from the aerial vehicle (e.g., the first aerial vehicle 102A and/or the second aerial vehicle 102B) to the central server 100. In one embodiment, the communication logic block 202 may enable the aerial vehicle to store (e.g., temporarily save) the geo-spatial location 110 (e.g., last previously saved geospatial location 802) and/or altitude data 112 on a memory 105 of the aerial vehicle. This may enable the use of an undo function 806 on a computing device (e.g., the first computing device 104A) to be executed in a decentralized configuration of the aerial vehicle organization system 150.

In one embodiment, the aerial vehicle may have an intelligent emergency function in which motors of the aerial vehicle may shut down (e.g., rotors may automatically stop and/or power to the rotors may stop) when it is determined that a landing process (e.g., a landing command 108 being executed) of the aerial vehicle has failed and/or is failing to reduce altitude of the aerial vehicle at an expected rate (e.g., a specified rate of decline and/or a predetermined rate of decline). In one embodiment, the central server 100 may use the geo-spatial location 110 and/or altitude data 112 to make the determination. The aerial vehicle may use stored altitude data 112 and/or the geo-spatial location 110 (e.g., from sensors of the aerial vehicle and/or the GPS network 111) to make the determination, according to one embodiment.

The peer-to-peer logic block 204 may create the ad hoc LAN 118 and/or enable the aerial vehicles to directly communicate with each other through the ad hoc LAN 118. The turn-and-face logic block 206 may maneuver the aerial vehicle and/or instruct the aerial vehicle (e.g., the second aerial vehicle 102B) to execute a semicircular rotation such that the aerial vehicle turns and/or faces another aerial vehicle (e.g., the first aerial vehicle 102A). The turn-and-face logic block 206 may cause the aerial vehicle to position itself in such a way that the aerial vehicle has a same altitude as the another aerial vehicle and/or a first person view camera (e.g., the camera 604) of the aerial vehicle is level and/or lined up with the first person view camera of the another aerial vehicle.

The back-up logic block 208 may back the aerial vehicle (e.g., the aerial vehicle executing the turn-and-face operation) up a distance away from the another aerial vehicle (e.g., 1 meter, 5 meters, and/or 10 meters) while maintaining the altitude of the another aerial vehicle. The follow-the leader logic block may designate an aerial vehicle (e.g., the first aerial vehicle 102A) of a group of aerial vehicles as a master aerial vehicle. In one embodiment, the designation may be made at least in part based on which aerial vehicle was added to the group first, which aerial vehicle is being controlled by the user (e.g., profile of the neighborhood social network) and/or computing device that created and/or requested the group of aerial vehicles form and/or enter a coordination agreement, and/or a vote. The follow the leader logic block may designate at least one other aerial vehicle of the group of aerial vehicles as a slave aerial vehicle.

In one embodiment, the slave aerial vehicle(s) minors and/or mimics the path, speed, maneuvers, position, and/or altitude of the master aerial vehicle in a designated manner while maintaining a no-fly zone 501 between any and/or all aerial vehicles in the group of aerial vehicles. In one embodiment, the user of the aerial vehicle (e.g., the first aerial vehicle 102A) may be required to have permission (e.g., granted through the computing devices of the other users and/or on the neighborhood social network 1100) from the at least one other user to coordinate with the aerial vehicle (e.g., the first aerial vehicle 102A) serving as the master aerial vehicle and the at least one other aerial vehicle of the at least one other user as the slave aerial vehicle. Users may be able to grant permission allowing their aerial vehicle to be a slave aerial vehicle for a set amount of time, after which the aerial vehicle may land, exit the coordinated activities, and/or enter a safe mode (e.g., safely exit the coordinated activities and/or hover) until control is taken by the user.

In one embodiment, the central server 100 may make the slave aerial vehicle(s) aware of the path, aerial and/or geo-spatial location 110, speed, altitude, and/or planned movements of the master aerial vehicle. The master aerial vehicle may keep the slave aerial vehicles informed of the abovementioned information through the ad hoc LAN 118. Slave aerial vehicles may be able to propagate this information and/or information about the operational status of aerial vehicles to other slave aerial vehicles through the ad hoc LAN 118. Aerial vehicles (e.g., all aerial vehicles working in coordination and/or in a specified geo-spatial and/or aerial area) may be able to perform redundant cross checking of the above mentioned information and/or operational status of the other aerial vehicles (e.g., any and/or all aerial vehicles working in coordination) using the ad hoc LAN 118 and/or Internet protocol network 101.

The ad hoc LAN 118 may act as a fail-safe, enabling the master aerial vehicle and/or slave aerial vehicle to remain connected and/or informed of relevant information should the master aerial vehicle and/or slave aerial vehicle temporarily lose connection with the Internet protocol network 101 and/or central server 100. In one embodiment, the master aerial vehicle and/or slave aerial vehicle may send an alert message (e.g., through the ad hoc LAN 118) of an emergency state (e.g., a mechanical failure, a loss and/or expected loss of network connection, low battery, and/or a system failure) to at least one of the other aerial vehicles working in coordination. The failing aerial vehicle may automatically land and/or at least one of the other aerial vehicles working in coordination may send the failing aerial vehicle instructions for safe removal from coordination.

In one embodiment, a distributed algorithm may be used to enable the slave aerial vehicles (e.g., in a scenario with multiple slave aerial vehicles and one master aerial vehicle) to select a new master aerial vehicle from the slave aerial vehicles if the master aerial vehicle leaves the coordinated group of aerial vehicles (e.g., drops out, has to land, malfunctions, and/or is indicated to not be the master aerial vehicle any more). In one embodiment, a loss of the master aerial vehicle may cause the coordinated vehicles (e.g., all slave aerial vehicles) to automatically enter the safe mode and/or land. The loss of the master aerial vehicle may send a warning to the users of the slave aerial vehicles that control will need to be seized within a certain time frame (e.g., 30 seconds).

The no-fly logic block 212 may create a no-fly zone 501 between aerial vehicles (e.g., between the first aerial vehicle 102A and the second aerial vehicle 102B). The no-fly zone 501 is discussed in further detail in FIG. 5. The assumption logic block 214 may automatically assume a previous geo-spatial location and/or a previous altitude of an aerial vehicle (e.g., the first aerial vehicle 102A) when the aerial vehicle (e.g., the first aerial vehicle 102A) indicates (e.g., through a take-over function) that the aerial vehicle's remaining battery power is below a threshold level. The take-over function (e.g., the take-over function authorized by the user of the aerial vehicle) may be communicated to the second user 106B and/or second aerial vehicle 102B through the Internet protocol network 101 using the central server 100 and/or the ad hoc LAN 118 between the first aerial vehicle 102A and the second aerial vehicle 102B. In one embodiment, the geo-spatial location 110 and/or altitude from where the take-over function was sent (e.g., of the aerial vehicle at the time the aerial vehicle and/or user of the aerial vehicle sent the take-over function) may be assumed to be the pervious geo-spatial location and/or previous altitude. The first aerial vehicle 102A, second aerial vehicle 102B, the first computing device 104A, second computing device 104B, and/or central server 100 may include the communication logic block 202, the peer-to-peer logic block 204, the turn-and-face logic block 206, the back-up logic block 208, the follow-the-leader logic block 210, the no-fly circuitry, and/or the assumption logic block 214.

Figure 3A:
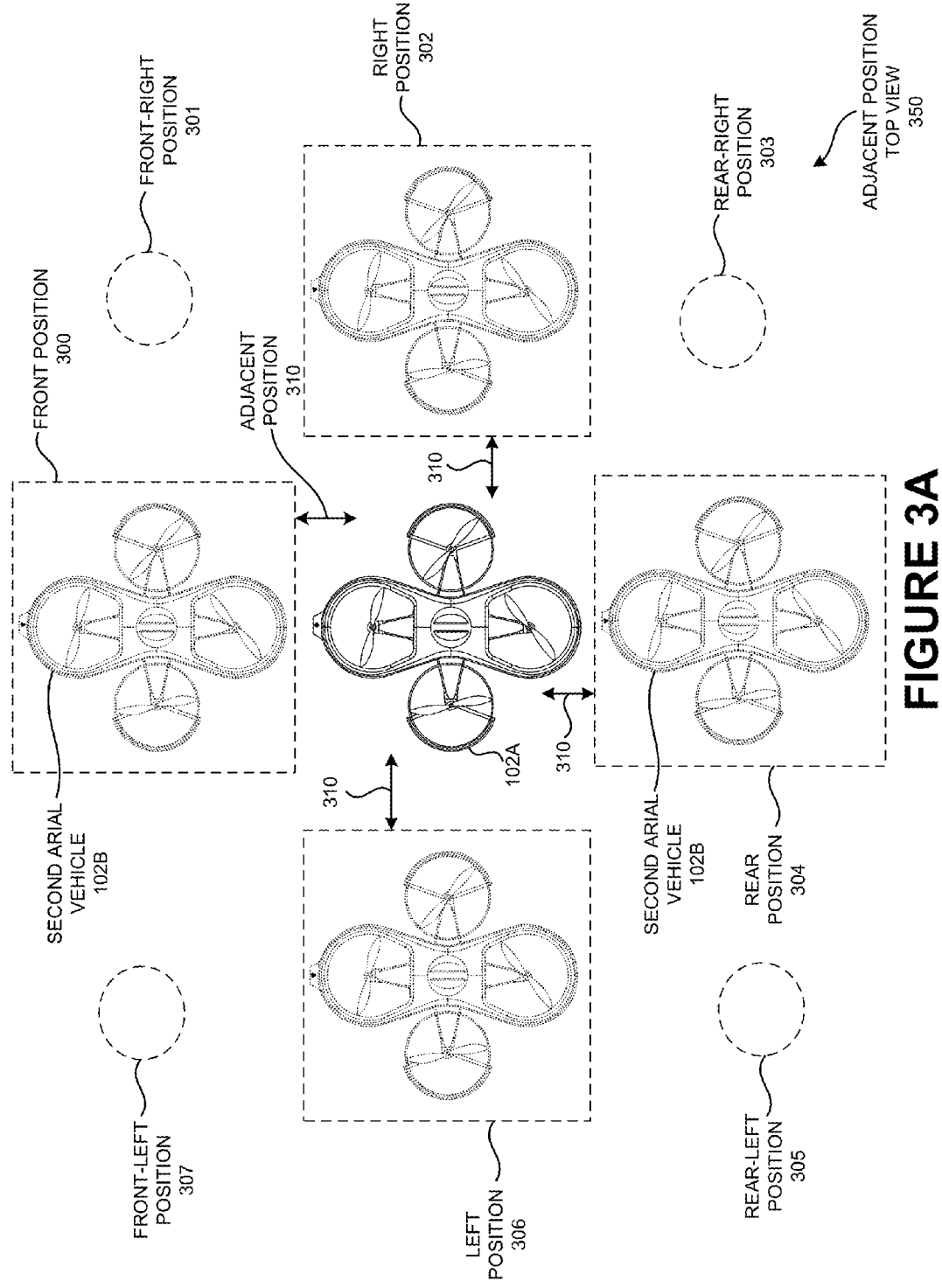
FIG. 3A is an adjacent position top view of the second aerial vehicle of FIG. 1 occupying possible positions in relation to the first aerial vehicle of FIG. 1, according to one embodiment.

FIG. 3A is an adjacent position top view 350 of the second aerial vehicle of FIG. 1 occupying possible positions in relation to the first aerial vehicle of FIG. 1, according to one embodiment. FIG. 3A shows a front position 300, a front-right position 301, a right position 302, a rear-right position 303, a rear position 304, a rear-left position 305, a left position 306, a front-left position 307, and an adjacent position 310. In one embodiment, the first user 106A may use the first computing device 104A to command (e.g., send the command 108 through the centralized configuration or the decentralized configuration) one of the set of aerial vehicles to position itself in at least one of the multiple adjacent positions 310 illustrated in FIG. 3A. The adjacent position 310 may be any position in relation to one or more aerial vehicles, a geospatial coordinate and/or a position in the sky.

The first aerial vehicle 102A may communicate information (e.g., planned maneuvers, its current geospatial location 804, instructions, and/or planned routs (e.g., a set of coordinates along a planned flight path)) to the second aerial vehicle 102B through the ad hoc LAN 118. In one embodiment, this may enable the second aerial vehicle 102B to fly in a coordinated manner with the first aerial vehicle 102A (e.g., maintain a threshold distance 500 away, an altitude in relation to the first aerial vehicle 102A, and/or a position in relation to the first aerial vehicle 102A).

Figure 3B:
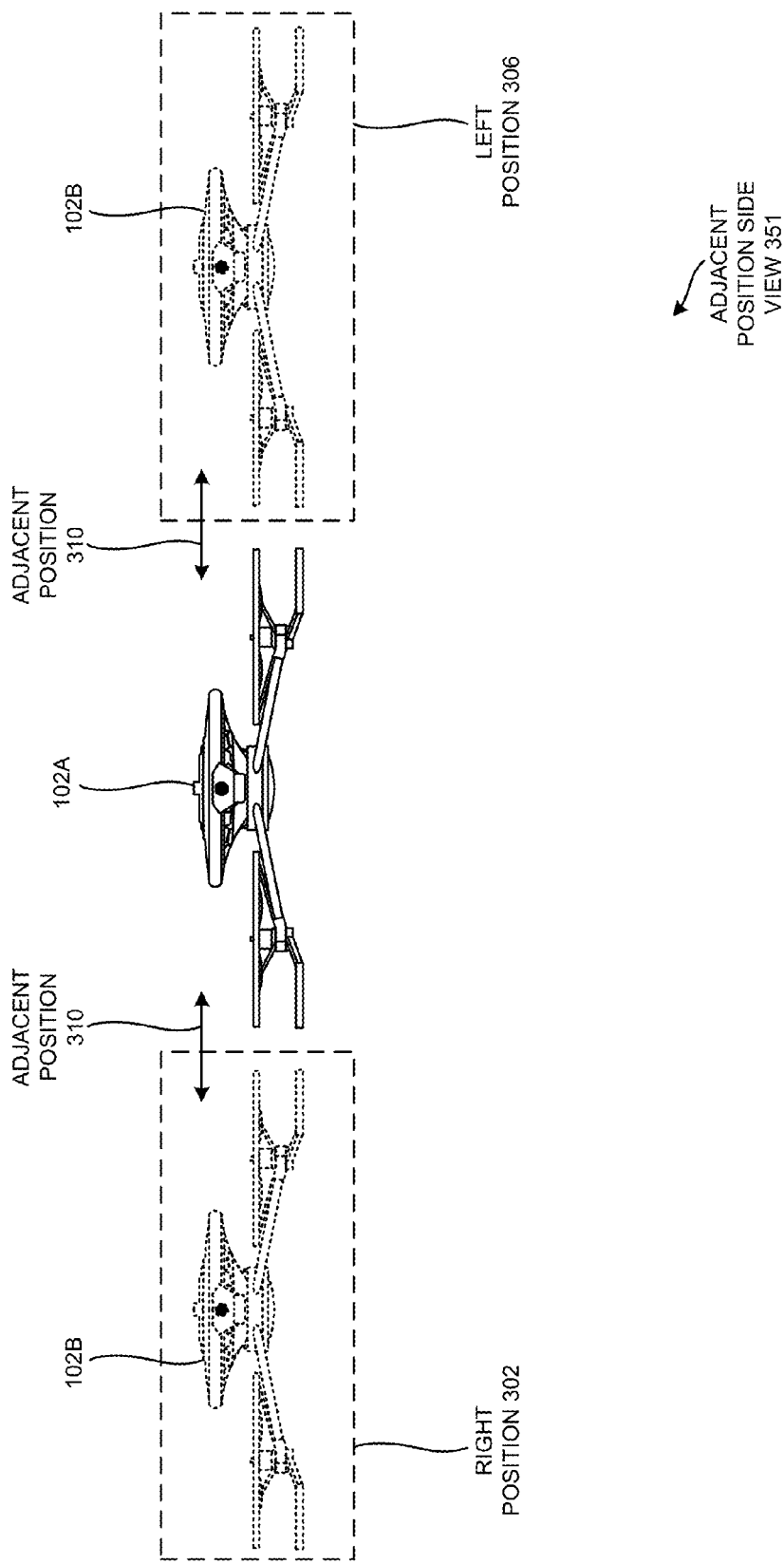
FIG. 3B is an adjacent position side view of the second aerial vehicle of FIG. 1 occupying a right position and a left position in an adjacent manner to the first aerial vehicle, according to one embodiment.

FIG. 3B is an adjacent position side view 351 of the second aerial vehicle of FIG. 1 occupying a right position and a left position in an adjacent manner to the first aerial vehicle, according to one embodiment. The second aerial vehicle 102B may be communicatively coupled with the first aerial vehicle 102A (e.g., through the ad hoc LAN 118, the Internet protocol network 101, and/or the central server 100). The second aerial vehicle 102B may be able to situate itself in the adjacent position 310 in real time, track, anticipate, and/or mirror the movements of the first aerial vehicle 102A using the ad hoc LAN 118, the central server 100, GPS network 111, and/or the Internet protocol network 101.

FIG. 4 is a geospatial position accuracy distribution view 450 of the probability cut-off of two aerial vehicles, according to one embodiment. In particular, FIG. 4 shows a normalized distribution probability 400A, a normalized distribution probability 400B, a collision zone 401, a probability cut-off 402A, and a probability of cut-off 402B. As discussed in FIG. 1, the GPS network 111 may enable the user, computing device, central server 100, and/or aerial vehicle to know the past and/or present geospatial coordinates, altitude, and/or location of one or more aerial vehicles. In one embodiment, the GPS network 111 may have a margin of error creating an area (e.g., a spherical region with a diameter of 5 meters) in which the GPS located object (e.g., the first aerial vehicle 102A and/or second aerial vehicle 102B) may be.

The probability of the first aerial vehicle 102A being in a particular location is represented by the normalized distribution probability 400A curve. The probability of the second aerial vehicle 102B being in a particular location is represented by the normalized distribution probability 400B curve. For example, the probability of the first aerial vehicle 102A being in a particular location may decrease the further the particular location is from the geospatial location indicated by the GPS network 111. The at least one computing device, aerial vehicle and/or central server 100 may generate a probability cut-off (e.g., the probability cut-off 402A-B). The probability cut-off 402A-B may be a probability (e.g., percent chance) that the aerial vehicle is in the particular location (e.g., the GPS network 111 being off by X amount of distance) past which the aerial vehicle organization system 150 is not willing to accept. The probability cut-off 402A and/or the probability cut-off 402B may act as boundaries of the collision zone 401. The probability cut-off may depend on weather conditions, the quality, type, and/or nature of the GPS network 111, and/or additional factors.

In an example embodiment, the aerial vehicle system may determine that the probability cut-off is 5%. The central server 100, aerial vehicle, and/or computing device may determine that the probability of the aerial vehicle being X distance from the indicated geospatial location (e.g., that the GPS network 111's reading is off by X distance) is 5%. X distance from the indicated geospatial location from the aerial vehicle may be marked as a boundary of the collision zone 401. The same process may be conducted for a second aerial vehicle 102B. The two marked boundaries (e.g., the distances from the geospatial location of the aerial vehicles provided by the GPS network 111 at which there is a 5% probability of being the correct location) may define the collision zone 401.

FIG. 5 is a buffer distance establishment view 550 of a threshold distance and a no-fly zone between two aerial vehicles, according to one embodiment. FIG. 5 shows a threshold distance 500 and a no fly zone. In one embodiment, the probability cut-off may represent a perimeter (e.g., a spherical perimeter), a radial distance from the aerial vehicle and/or the geospatial location provided by the GPS network 111. The radial distance may be determined as detailed above. In the example given above, the radial distance may be the distance X.

The threshold distance 500 may be a minimum distance the aerial vehicles must keep between themselves. While flying in a formation and/or entering the adjacent manner, the aerial vehicles may be required to stay at least the threshold distance 500 from one another. The threshold distance 500 may depend on the accuracy of aerial geo-spatial coordinates (e.g., the quality and/or nature of the GPS network 111 and/or quality and/or nature of hardware (e.g., GPS hardware) of the aerial vehicle(s)) of at least one of the first aerial vehicle 102A and the second aerial vehicle 102B. The threshold distance 500 may be larger when the aerial vehicles are in motion and/or may be reduced while hovering and/or traveling at slower speeds. The threshold distance 500 may be enforced and/or sensed by sensors on the aerial vehicle (e.g., sonar and/or ultrasound sensors).

In one embodiment, the no-fly zone 501 may be a distance that must be maintained between points on the perimeter associated with the probability cut-off. The no-fly zone 501 may be the collision zone 401. The purpose of the no-fly zone 501 may be to ensure a buffer area in the case that both of the aerial vehicles are at the particular location determined to have a probability equal to that of the probability cut-off (e.g., the actual location of each of the aerial vehicles is on the perimeter associated with the probability cut-off). In an example embodiment, the probability cut-off 402A for the first aerial vehicle 102A and the probability cut-off 402B of the second aerial vehicle 102B may be associated with a distance of 2.5 meters from the geospatial location for each aerial vehicle provided by the GPS network 111. The no-fly zone 501 may be one meter. Thus, the threshold distance 500 in this example embodiment would be 6 meters (2.5 m+1 m+2.5 m).

Figure 6:
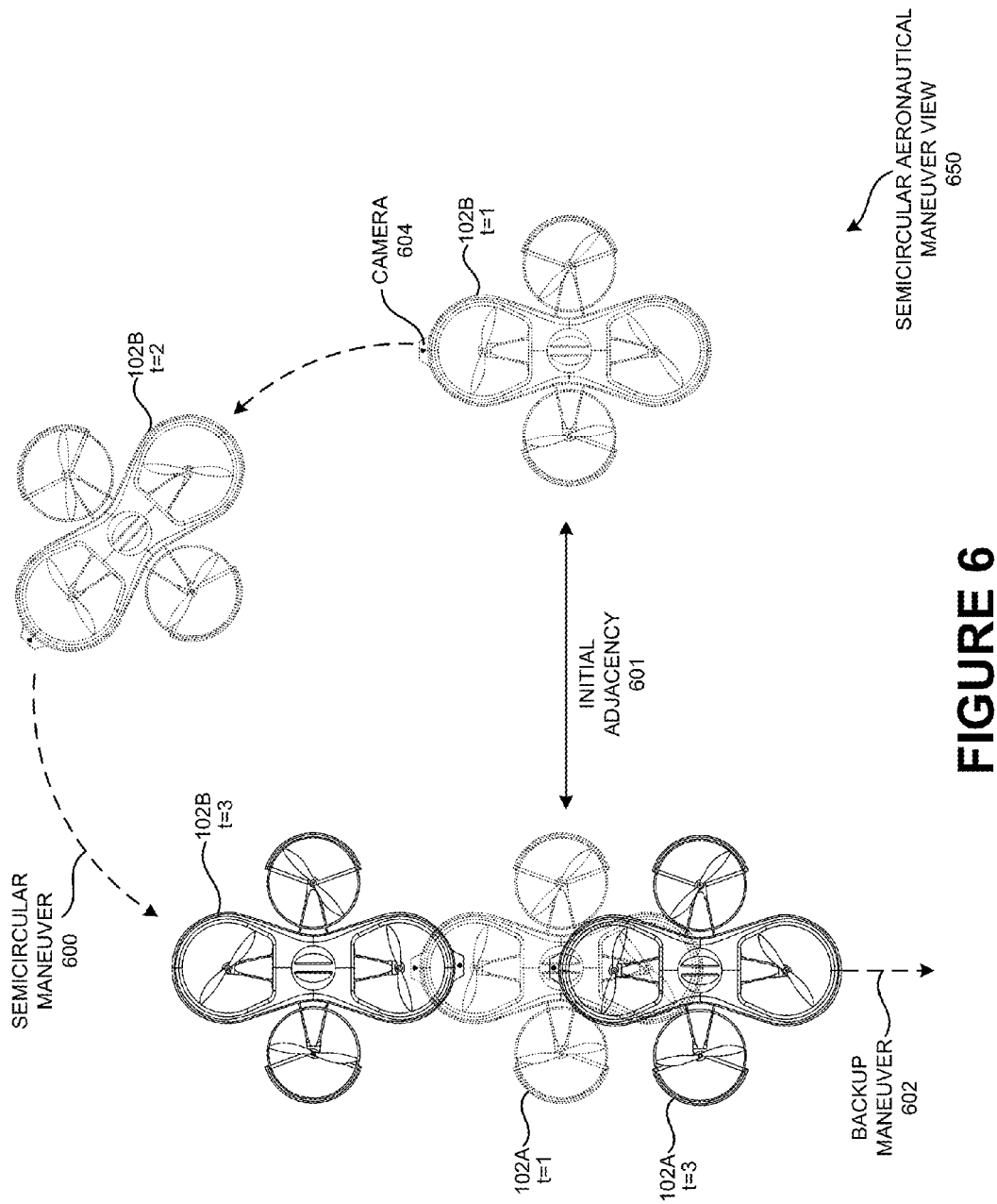
FIG. 6 is a semicircular aeronautical maneuver view, according to one embodiment.

FIG. 6 is a semicircular aeronautical maneuver view 650, according to one embodiment. In particular, FIG. 6 shows a semicircular maneuver 600, an initial adjacency 601, a backup maneuver 602, and a camera 604. The second aerial vehicle 102B may be able to execute the semicircular maneuver 600 (e.g., a semicircular rotation) in order to maneuver from the initial adjacency 601 (e.g., to the right of and facing the opposite direction as the first aerial vehicle 102A) to a position facing the first aerial vehicle 102A. In one embodiment, the semicircular maneuver 600 may be a turn-and-face operation in which the second aerial vehicle 102B turns and faces the first aerial vehicle 102A and/or the cameras 604 of the aerial vehicles (e.g., the first person view cameras) face one another.

The first aerial vehicle 102A and/or second aerial vehicle 102B may perform the backup maneuver 602. The backup maneuver 602 may back the aerial vehicle up a distance away from the other aerial vehicle now facing the aerial vehicle while maintaining the altitude of the other aerial vehicle. The backup maneuver 602 may be communicated through the central server 100, the Internet protocol network 101, and/or the ad hoc LAN 118.

Figure 7:
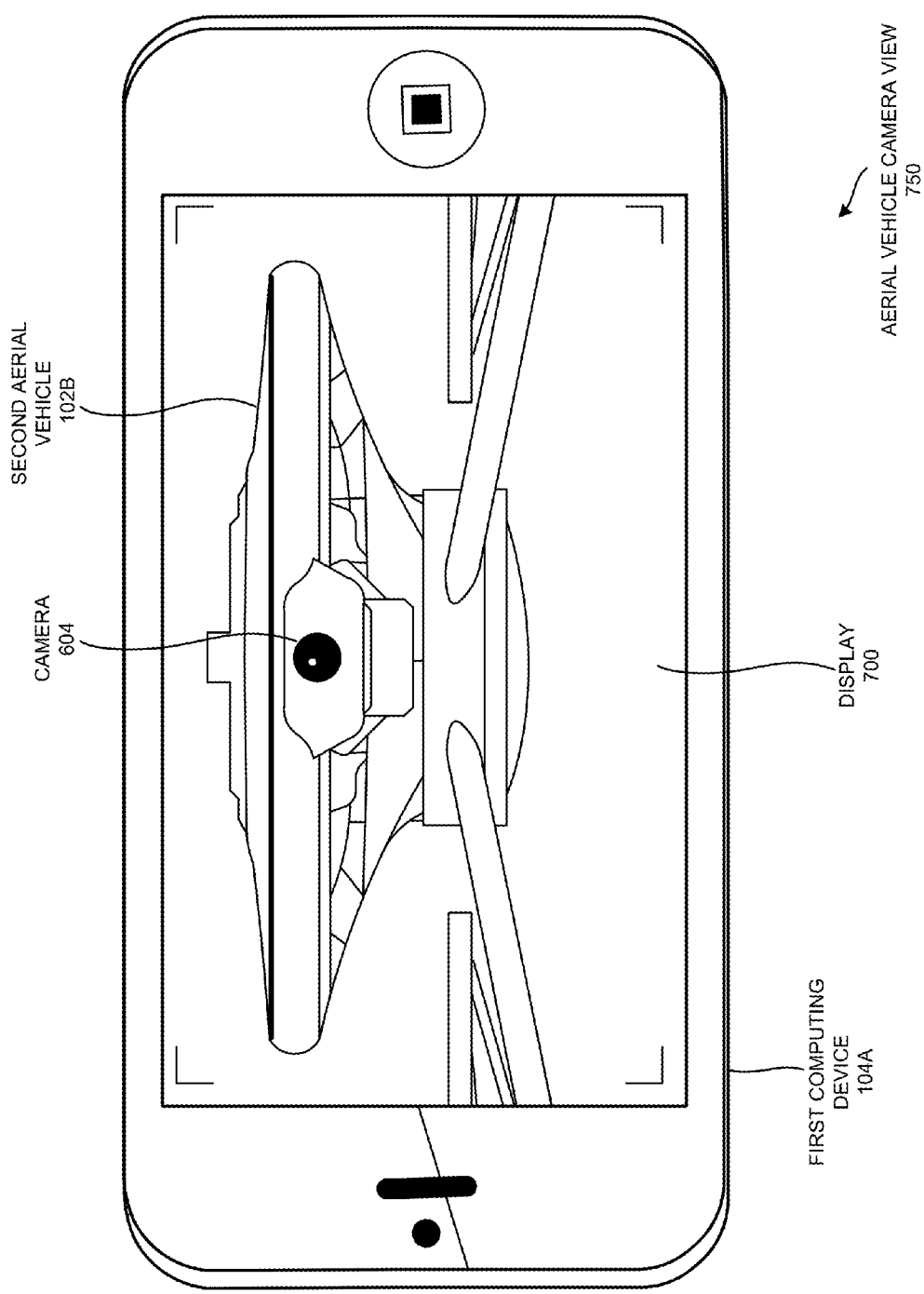
FIG. 7 is an aerial vehicle camera view of the first computing device 104A of FIG. 1 showing the view of the camera of the first aerial vehicle of FIG. 1, according to one embodiment.

FIG. 7 is an aerial vehicle camera view 750 of the first computing device of FIG. 1 showing the view of the camera of the first aerial vehicle of FIG. 1, according to one embodiment. The display 700 of the computing device (e.g., the first computing device 104A) may show pictures and/or video (e.g., in real time and/or recorded) captured by the camera 604 of the aerial vehicle (e.g., the first aerial vehicle 102A). In one embodiment, the aerial vehicles may be equipped with microphones. The first user 106A of the first computing device 104A may be able to record and/or send an audio message to be played by the first aerial vehicle 102A. The second user 106B may be able to hear the audio message played by the first aerial vehicle 102A through the second computing device 104B. In one embodiment, the users may be able to communicate to each other through their computing devices without the aerial vehicles and/or central server 100.

In one embodiment, the first aerial vehicle 102A and/or the second aerial vehicle 102B may have an interface (e.g., a screen) to display messages written by the user of the aerial vehicle and/or sent from the user's computing device through the central server 100, cellular network, and/or Internet protocol network 101 to the aerial vehicle(s). The display may show a message communicated by the second aerial vehicle 102B.

Figure 8:
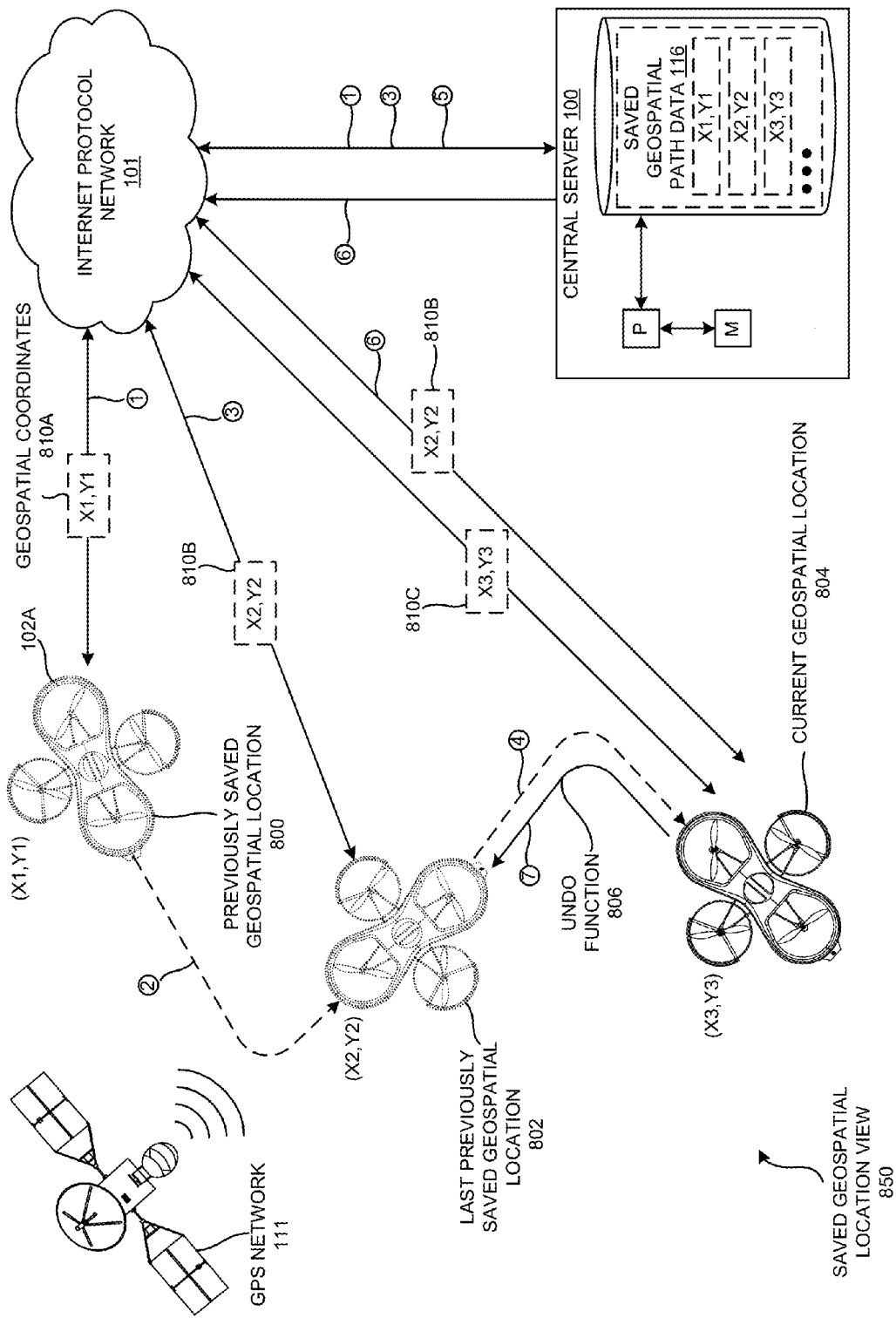
FIG. 8 is a saved geospatial location view of an aerial vehicle returning from its current geospatial location to the last previously saved geospatial location using an undo function, according to one embodiment.

FIG. 8 is a saved geospatial location view 850 of an aerial vehicle returning from its current geospatial location to the last previously saved geospatial location 802 using an undo function, according to one embodiment. In particular, FIG. 8 shows a previously saved geospatial location 800, a last previously saved geospatial location 802, a current geospatial location 804, an undo function 806, and a geospatial coordinates 810A-C. In step one (shown as the circled 1), the first aerial vehicle 102A communicates geospatial coordinates 810A through the Internet protocol network 101 to the database 107 of the central server 100. The database 107 may store the geospatial coordinates 810A as saved geospatial path data 116. The first aerial vehicle 102A may communicate the geospatial coordinates 810A at predetermined intervals (e.g., when the first aerial vehicle 102A has remained in the same location for two seconds).

In step two, the first aerial vehicle 102A may travel from the previously saved geospatial location 800 (e.g., the geospatial coordinates 810A). In step three, the first aerial vehicle 102A may communicate the geospatial coordinates 810B to the central server 100 (e.g., upon remaining in the same geospatial location for a threshold amount of time (e.g., two seconds)). The database 107 of the central server 100 may store the geospatial coordinates 810B along with geospatial coordinates 810A. In step four, the first aerial vehicle 102A may travel from the geospatial coordinates 810B (e.g., the last previously saved geospatial location 802).

In step five, a computing device (e.g., the first computing device 104A and/or the second computing device 104B) and/or an aerial vehicle (e.g., the second aerial vehicle 102B and/or another aerial vehicle) may send commands 108 to the central server 100 instructing the central server 100 to instruct the first aerial vehicle 102A to execute an undo function 806. A computing device and/or an aerial vehicle may instruct the first aerial vehicle 102A (e.g., through the decentralized configuration) to execute the undo function 806 without need of the central server 100. In such an embodiment, the first aerial vehicle 102A may store previously saved geospatial locations 800 in a memory of the first aerial vehicle 102A.

In step six, the central server 100 may access the saved geospatial path data 116 and/or communicate the last previously saved geospatial location 802 (e.g., the geospatial coordinated 810B) and/or instructions to navigate from the current geospatial location 804 (e.g., the geospatial coordinated 810C communicated to the central server 100) to the last previously saved geospatial location 802 through the Internet protocol network 101 and/or cellular network to the first aerial vehicle 102A. In one embodiment, the geospatial coordinates 810C of the current geospatial location 804 may be communicated to the central server 100 to enable the central server 100 to generate, using the processor 103 and the memory 105, a set of instructions and/or flight path from the geospatial coordinated 810C to the geospatial coordinated 810B. The set of instructions and/or flight path may be communicated from the central server 100 to the first aerial vehicle 102A. The geospatial coordinates 810C may be stored in the database 107. In step seven, the first aerial vehicle 102A may execute the undo function 806, returning to the last previously saved geospatial location 802.

Figure 9:
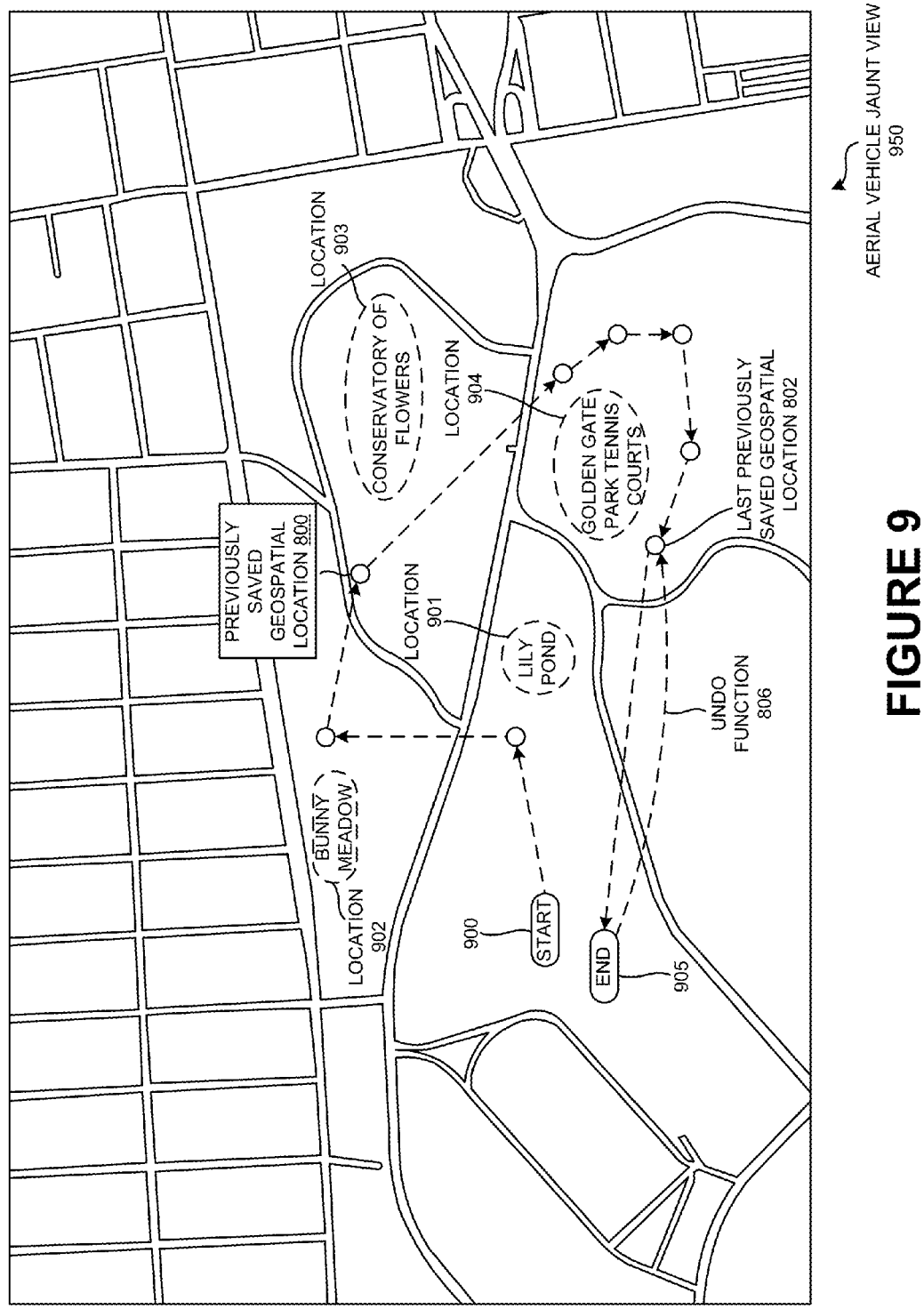
FIG. 9 is an aerial vehicle jaunt view showing previously saved geospatial locations of an aerial vehicle, according to one embodiment.

FIG. 9 is an aerial vehicle jaunt view 950 showing previously saved geospatial locations of an aerial vehicle, according to one embodiment. Particularly, FIG. 9 shows a start 900, a location 901, a location 902, a location 903, a location 904, and an end 905. In one embodiment, an aerial vehicle (e.g., the first aerial vehicle 102A) may travel from the start 900 to "Lily Pond" (i.e., the location 901). The aerial vehicle may hover around the pond taking pictures and/or video. The geospatial coordinates of the location of the hovering aerial vehicle may be communicated to the central server 100. The aerial vehicle may then travel to "Bunny Meadow" (i.e., the location 902) and/or hover above the meadow to watch a soccer game. The aerial vehicle may communicate its geospatial coordinates after hovering for a threshold amount of time (e.g., two seconds). The geospatial coordinates communicated while the aerial vehicle hovered by the location 902 may be the previously saved geospatial location 800 and/or the last previously saved geospatial location 802. The aerial vehicle may continue to travel to "Conservatory of Flowers" (i.e., the location 903) and "Golden Gate Park Tennis Courts" (i.e., the location 904), repeating the same process.

The aerial vehicle may hover in multiple locations around the tennis courts at location 904 to view and/or film the matches, transmitting the geospatial coordinates at which the aerial vehicle remains for a threshold amount of time. In one embodiment, the user may be able to drop a pin and/or mark a location (e.g., geospatial coordinates) at any time to be saved in the database 107 and/or aerial vehicle (e.g., using a function on the display 700). The aerial vehicle may leave the last saved geospatial location that was communicated from the aerial vehicle to the central server 100 and travel to the end 905. The aerial vehicle may receive instructions from the central server 100 and/or the computing device associated with the user of the aerial vehicle to execute an undo function 806. The aerial vehicle may return to the last saved geospatial location 802.

In one embodiment, another aerial vehicle (e.g., the second aerial vehicle 102B) may be able to coordinate with the aerial vehicle (e.g., the first aerial vehicle 102A) in order to optimally capture the tennis match being viewed at location 904. The aerial vehicles may be able to position themselves in a manner that maximizes their combined coverage (e.g., view and/or video capture-able view) of the match, according to one embodiment. The aerial vehicle may be able to alert the another aerial vehicle when the aerial vehicle is running low on battery and/or memory for video, audio, and/or pictorial data and/or when the aerial vehicle is leaving. The another aerial vehicle (e.g., the second aerial vehicle 102B) and/or central server 100 may determine if the position of the aerial vehicle is desired and/or may occupy and/or instruct the another aerial vehicle to occupy the desired position (e.g., the geospatial location and/or altitude from where the aerial vehicle sent the alert). The another aerial vehicle may maneuver to the desired position and/or resume its previous task and/or assume the task (e.g., videotaping) being executed by the aerial vehicle that sent the alert. In another embodiment, the aerial vehicle may send a command (e.g., in the form of the alert and/or a take-over function and/or the command 108) to the another vehicle (e.g., a slave vehicle) to take over the task of the aerial vehicle at the position from where the aerial vehicle sent the alert. The alert may be communicated through the ad hoc LAN 118, the cellular network, and/or the Internet protocol network 101.

Figure 10:
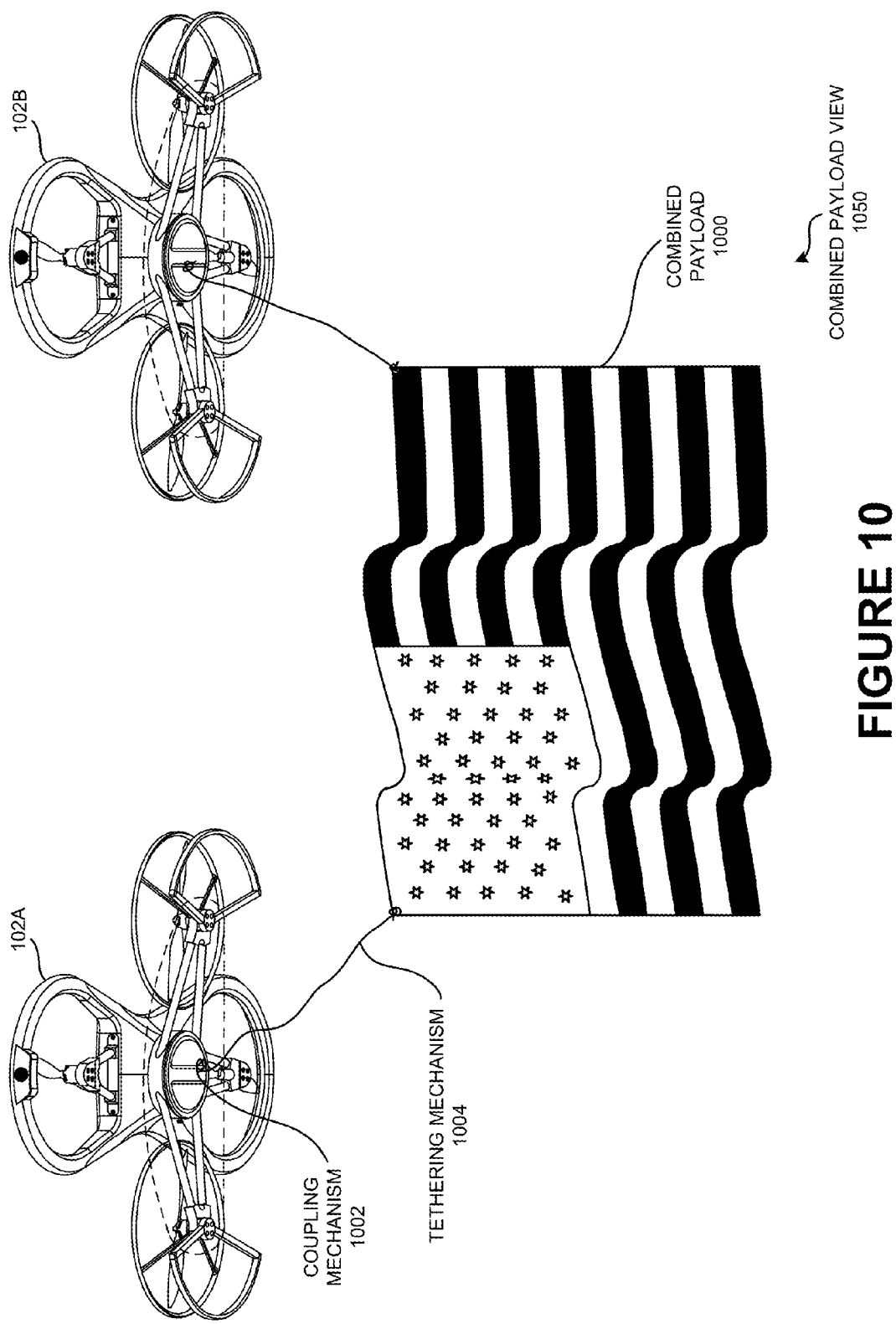
FIG. 10 is a combined payload view of two aerial vehicles sharing a combined payload, according to one embodiment.

FIG. 10 is a combined payload view 1050 of two aerial vehicles sharing a combined payload, according to one embodiment. FIG. 10 shows a combined payload 1000, a coupling mechanism 1002, and a tethering mechanism 1004. In one embodiment, the coupling mechanism 1002 may enable attachments with connection means complementary to the coupling mechanism 1002 to attach to the aerial vehicle. In one embodiment, the coupling mechanism 1002 may secure attachments with a quarter turn of the connection means of the attachment. The coupling means may be customizable and/or may be a camera assembly, a hook assembly, a container assembly, a tethering assembly, a lighting assembly and/or another connection assembly. The tethering assembly may include a means through which the tethering mechanism 1004 (e.g., rope, rod, string, cord, and/or line) may be securely connected to the aerial vehicle. In one embodiment, the tethering and/or hooking means may include contraction and/or retraction means. The tethering and/or hooking means may enable the payload to be brought closer and/or further from the aerial vehicle.

In one embodiment, multiple aerial vehicles may coordinate to lift, carry, and/or display the combined payload 1000. The combined payload 1000 may be distributed (e.g., evenly distributed) between the aerial vehicles. In one embodiment, one or more aerial vehicles working in coordination (e.g., to share a combined payload 1000) may send alerts to others of the aerial vehicles working in coordination and/or other aerial vehicles (e.g., other aerial vehicles in the area, belonging to and/or being used by certain users, and/or existing in a certain area) indicating need of assistance, battery power below a threshold level, and/or a failure state of the aerial vehicle sending the alert. In one embodiment, the alert may be communicated through the ad hoc LAN 118.

Figure 11:
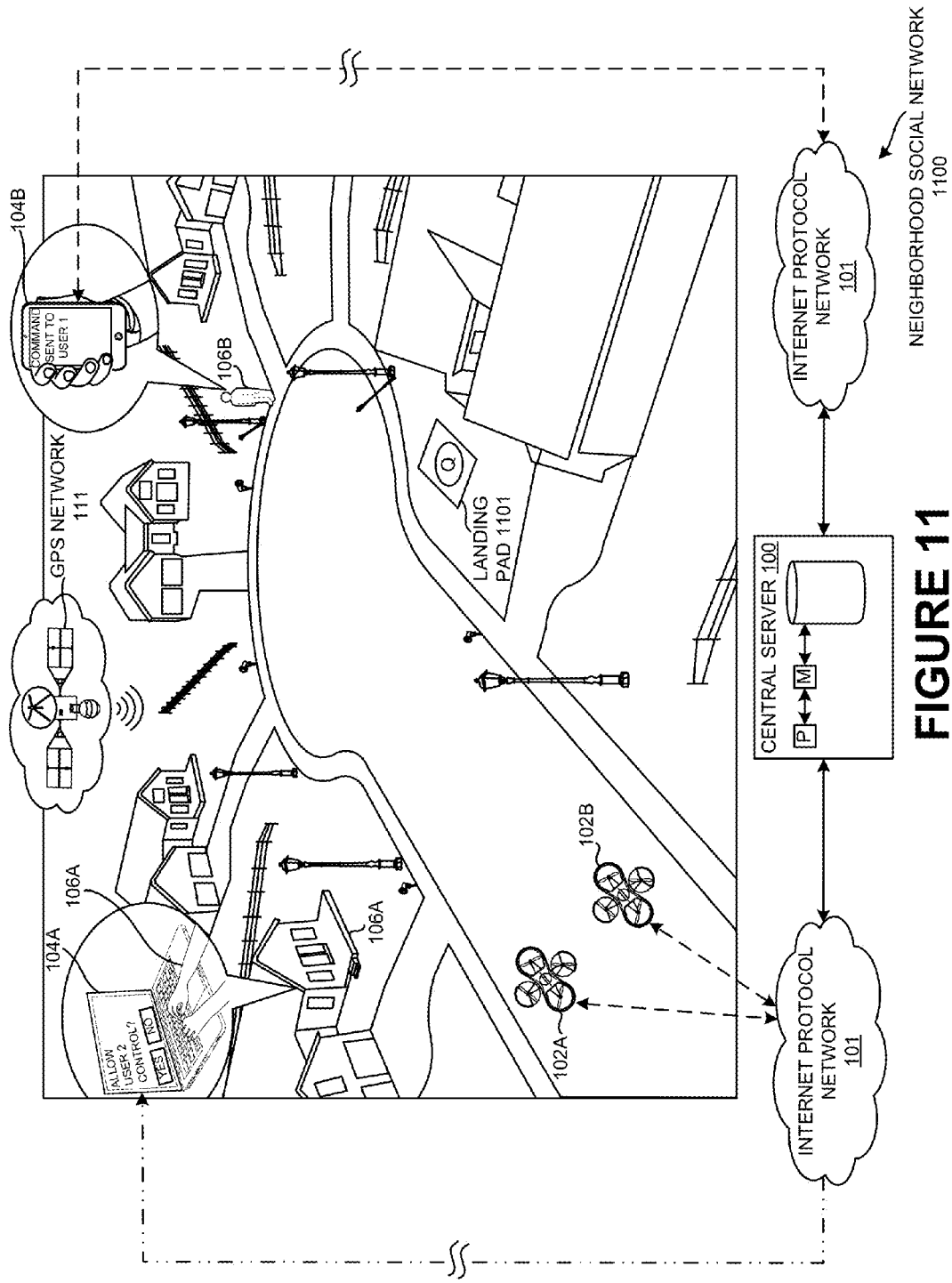
FIG. 11 shows a neighborhood social network with two users communicatively coupled through the Internet protocol network, according to one embodiment.

FIG. 11 shows a neighborhood social network with two users communicatively coupled through the Internet protocol network, according to one embodiment. In particular, FIG. 11 shows the neighborhood social network 1100 and a landing pad 1101. In one embodiment, the first user 106A and the second user 106B may log onto the neighborhood social network 1100 using the first computing device 104A (e.g., a laptop associated with the first user 106A) and the second computing device 104B (e.g., a smart phone associated with the second user 106B). The users may be communicatively coupled on the neighborhood social network 1100 (e.g., the first user 106A and the second user 106B may be communicatively coupled with the central server 100 through the Internet protocol network 101). The users may communicate on the neighborhood social network 1100 their desire to coordinate their aerial vehicles.

The second user 106B may request permission (e.g., using the second computing device 104B and/or on the neighborhood social network 1100) to send command(s) 108 to the first aerial vehicle 102A. The first user 106A may allow the second user 106B to control the first aerial vehicle 102A (e.g., by granting permission on the first computing device 104A and/or on the neighborhood social network 1100). The second user 106B may send the command 108, using the second computing device 104B, through the Internet protocol network 101 to the central server 100. The central server 100 may communicate instructions to the first aerial vehicle 102A (e.g., to follow, mimic, and/or maneuver to an adjacent position 310 to the second aerial vehicle 102B) through the Internet protocol network 101. In another embodiment, the second user 106B may send the command 108 through the decentralized configuration (e.g., through the Internet protocol network 101, wifi, a wide area network, and/or a cellular network to the second aerial vehicle 102B without involvement of the central server 100).

The GPS network 111 may enable the first aerial vehicle 102A to be aware of its location and/or the location of the second aerial network, allowing the first aerial vehicle 102A to maneuver and/or execute instructions to take the adjacent position 310, maintain the threshold distance 500 and/or no-fly zone 501. In one embodiment, at least one of the aerial vehicles may be instructed to land on the landing pad 1101. The GPS, sensors on the at least one aerial vehicle, and/or instructions from the central server 100, other aerial vehicle and/or computing device may guide and/or enable the at least one aerial vehicle to land on the landing pad 1101. In one embodiment, the landing pad 1101 may be a physical landing surface (e.g., a mat with a readable QR code, marking, and/or signal), a beacon designating a landing spot, and/or a previously designated area (e.g., an area marked using a computing device and/or designated on the neighborhood social network 1100 as the landing pad 1101)).

An example embodiment will now be described. In one embodiment, Bob may wish to videotape his son's soccer game. However, Bob may not be able to follow the plays and/or view the field well enough using his one aerial vehicle. Bob may be able to work with other parents of players to coordinate their aerial vehicles above the field. The team of parents may be able to organize and/or coordinate their aerial vehicles to properly capture multiple angles of the game in order to create a video far better than they each could have made on their own. The video feeds from the aerial vehicles may be streamed live to player devices and/or may be stored on the central server 100 so that parents may be able to access and/or edit the video later using the multiple angles captured. Video captured from the same angle may be centrally located and/or stored (e.g., on the central server 100). In one embodiment, Bob may be able to indicate to another aerial vehicle that his aerial vehicle needs to vacate its position above the soccer field due to low battery power. Bob's aerial vehicle may be the master aerial vehicle and/or may instruct another aerial vehicle of the group of aerial vehicle to take the spot of his aerial vehicle in order to ensure seamless coverage from that angle. The result may be an expertly covered tape of the game that may be used by the coach for educational purposes and/or shared with relatives of the players.

In another example embodiment, Oak Park High School may not have lights over its football field. The school may not have money in its budget to put lights in and/or may not be able to host night games as a result due to league rules and/or safety concerns. As a result, players at Oak Park High School may need to travel long distances to play games and/or may not be able to have a home game during the fall and/or winter due to lack of lighting for night games.

Members of the community may be able to coordinate their aerial vehicles using the aerial vehicle organization system 150. The coordinated aerial vehicles may be able to lift and/or support a combined payload 1000 of flood lights (e.g., using the tethering mechanism 1004). The aerial vehicles may be able to form a configuration over the football field that enables the payload of flood lights to sufficiently illuminate the field. Through the use and coordination of aerial vehicles, members of the community may be able to help members of the Oak Park High School football team play a home game under the lights in front of their classmates and family.

In yet another embodiment, Steven may own his own business. He may find that traditional advertising is costly and/or ineffective. Posters and/or billboards may become commonplace and/or may not be noticed as they become part of the scenery. Steven may be able to coordinate several aerial vehicles to lift and/or carry a banner and/or other advertisement over the neighborhood in which his shop operates. The aerial vehicles and/or advertisement attached therewith may draw a large amount of attention. Steven may be able to use the aerial vehicle organization system 150 to promote his business and connect with his neighborhood in a cheap, safe, and/or intriguing manner.

In addition, it will be appreciated that the various operations, processes and methods disclosed herein may be embodied in a non-transitory machine-readable medium and/or a machine-accessible medium compatible with a data processing system (e.g., a computer system). Accordingly, the specification and drawings are to be regarded in an illustrative rather than a restrictive sense.

What is claimed is:

1. A system comprising:
a central server;
an Internet protocol network;
a first aerial vehicle communicatively coupled with the central server through the Internet protocol network;
a second aerial vehicle communicatively coupled with the first aerial vehicle when a command is transferred through the central server using the Internet protocol network;
a first computing device of a first user of the first aerial vehicle operatively controlling the first aerial vehicle through the first computing device through the Internet protocol network,
wherein the first computing device to include an undo function to maneuver the first aerial vehicle in flight to a last previously saved geo-spatial location of the first aerial vehicle based on a last previous location of the first aerial vehicle stored in the central server when the undo function is initiated; and
a second computing device of a second user of the second aerial vehicle operatively controlling the second aerial vehicle through the second computing device through the Internet protocol network, and
wherein at least one of the first computing device of the first user and the second computing device of the second user to communicate the command to the first aerial vehicle through the central server,
a neighborhood social network through which the first user and the second user are communicatively coupled to each other,
wherein the first user is connected to the second user in the neighborhood social network prior to the second computing device of the second user communicating the command to the first aerial vehicle through the central server, and
wherein at least one of the first computing device and the second computing device is at least one of a mobile device and a desktop computer.

2. The system of claim 1:
a communication logic block to communicate a current geo-spatial location and an altitude data of the first aerial vehicle to the central server when the first aerial vehicle is hovering at the current geo-spatial location for at least a threshold amount of time,
wherein the threshold amount of time is at least approximately two seconds of time.

3. The system of claim 2:
wherein the command communicated by the second computing device of the second user to the first aerial vehicle through the central server to be a set of instructions that instruct any of the first computing device, the first aerial vehicle, and the second aerial vehicle that the second aerial vehicle to position itself in an adjacent manner in relation to the first aerial vehicle at a threshold distance away that is at least one of to a left to the first aerial vehicle, to a right of the first aerial vehicle, to a front of the first aerial vehicle, and to a rear of the first aerial vehicle.

4. The system of claim 3:
a turn-and-face logic block to maneuver the second aerial vehicle in a semicircular rotation from the first aerial vehicle such that the second aerial vehicle is facing the first aerial vehicle through first person view cameras of both the first aerial vehicle and the second aerial vehicle when the command instructs a turn-and-face operation, and
a back-up logic block to back the second aerial vehicle up a distance away while maintaining the altitude of the first aerial vehicle through the central server when in the semi-circularly rotated state of the second aerial vehicle.

5. The system of claim 4:
wherein the threshold distance away is based on an accuracy of aerial geo-spatial coordinates of at least one of the first aerial vehicle and the second aerial vehicle.

6. The system of claim 5 further comprising:
a no-fly logic block to create a no-fly zone between the first aerial vehicle and the second aerial vehicle based on the threshold distance,
wherein the first aerial vehicle and the second aerial vehicle each of which have an attachment through which a payload weight is transportable.

7. The system of claim 6:
a follow-the-leader logic block to designate the first aerial vehicle as a master aerial vehicle and the second aerial vehicle as a slave aerial vehicle, such that an aeronautical maneuver of the master aerial vehicle to be mirrored by the slave aerial vehicle at an equivalent displacement in a three dimensional space while maintaining a separation in the no-fly zone between the first aerial vehicle and the second aerial vehicle.

8. The system of claim 7:
wherein a group of at least two aerial vehicles carry a combined payload equivalent to proportionally an addition of the payload weight of individual aerial vehicles forming the group of at least two aerial vehicles.

9. The system of claim 8:
wherein the combined payload is an outdoor sign that is liftable by a tethering of individual ones of the aerial vehicles through a coupling mechanism that attach locations of the outdoor sign with each of the aerial vehicles forming the group of at least two aerial vehicles.

10. The system of claim 9:
wherein the combined payload is a flood lighting that is liftable by the tethering of individual ones of the group of at least two aerial vehicles through the coupling mechanism that attaches an assembly of the flood lighting with each of the aerial vehicles forming the group of at least two aerial vehicles.

11. The system of claim 1 wherein any of the first aerial vehicle to include an intelligent emergency function in which rotors of the first aerial vehicle to shut-down power when a landing command provided by the first computing device fails to reduce altitude of the first aerial vehicle at an expected rate of descent.

12. The system of claim 1 further comprising:
a peer-to-peer logic block to enable the first aerial vehicle and the second aerial vehicle to also directly communicate with each other in-flight through an ad-hoc local area network formed between the first aerial vehicle and the second aerial vehicle, and
an assumption logic block to automatically assume a previous geo-spatial location and a previous altitude of the first aerial vehicle when the first aerial vehicle indicates that a remaining battery power of the first aerial vehicle is below a threshold level based on a take-over function authorized by the first user and communicated to the second user through at least one of the Internet protocol network using the central server and the ad-hoc local area network between the first aerial vehicle and the second aerial vehicle.

13. A method comprising:
communicatively coupling a first aerial vehicle with a central server through an Internet protocol network;
communicatively coupling a second aerial vehicle with the first aerial vehicle when a coordination command is transferred through the central server using the Internet protocol network;
operatively controlling the first aerial vehicle through a first computing device through the Internet protocol network using the first computing device of a first user;
operatively controlling the second aerial vehicle through a second computing device through the Internet protocol network using the second computing device of a second user,
wherein at least one of the first computing device of the first user and the second computing device of the second user communicate the coordination command to the first aerial vehicle through the central server,
wherein the first computing device to include an undo function to maneuver in flight the first aerial vehicle to a last previously saved geo-spatial location of the first aerial-vehicle based on a last previous location of the first aerial vehicle stored in the central server when the undo function is initiated,
wherein the first user and the second user are communicatively coupled to each other through a neighborhood social network, in which the first user is connected to the second user in the neighborhood social network prior to the second computing device of the second user communicating the coordination command to the first aerial vehicle through the central server, and
wherein at least one of the first computing device and the second computing device is at least one of a mobile device and a desktop computer.

14. The method of claim 13:
wherein first aerial vehicle to communicate a current geo-spatial location and an altitude data of the first aerial vehicle to the central server when the first aerial vehicle is hovering at the current geo-spatial location for at least a threshold amount of time,
wherein the threshold amount of time is at least approximately two seconds of time, and
wherein the coordination command communicated by the second computing device of the second user to the first aerial vehicle through the central server to be a set of instructions that instruct any of the first computing device, the first aerial vehicle, and the second aerial vehicle that the second aerial vehicle to position itself in an adjacent manner in relation to the first aerial vehicle at a threshold distance away that is at least one of to a left to the first aerial vehicle, to a right of the first aerial vehicle, to a front of the first aerial vehicle, and to a rear of the first aerial vehicle.

15. The method of claim 14:
wherein the second aerial vehicle to maneuver itself in a semicircular rotation from the first aerial vehicle such that the second aerial vehicle is facing the first aerial vehicle through first person view cameras of both the first aerial vehicle and the second aerial vehicle when the coordination command instructs a turn-and-face operation, and
wherein the second aerial vehicle to back up a distance away while maintaining the altitude of the first aerial vehicle through the central server when in the semicircularly rotated state of the second aerial vehicle.

16. The method of claim 15:
wherein the threshold distance away is based on an accuracy of aerial geo-spatial coordinates of at least one of the first aerial vehicle and the second aerial vehicle.

17. The method of claim 16:
wherein a no-fly zone is created between the first aerial vehicle and the second aerial vehicle based on the threshold distance, and
wherein the first aerial vehicle and the second aerial vehicle each of which have an attachment through which a payload weight is transportable.

18. The method of claim 17:
wherein the first aerial vehicle to be a master aerial vehicle and the second aerial vehicle to a be slave aerial vehicle, such that an aeronautical maneuver of the master aerial vehicle to be mirrored by the slave aerial vehicle at an equivalent displacement in a three dimensional space while maintaining a separation in the no-fly zone between the first aerial vehicle and the second aerial vehicle.

19. The method of claim 18:
wherein a group of at least two aerial vehicles carry a combined payload equivalent to proportionally an addition of the payload weight of individual aerial vehicles forming the group of at least two aerial vehicles.

20. The method of claim 19:
wherein the combined payload is an outdoor sign that is liftable by a tethering of individual ones of the aerial vehicles through a coupling mechanism that attach locations of the outdoor sign with each of the aerial vehicles forming the group of at least two aerial vehicles.

21. The method of claim 20:
wherein the combined payload is a flood lighting that is liftable by the tethering of individual ones of the group of at least two aerial vehicles through the coupling mechanism that attaches an assembly of the flood lighting with each of the aerial vehicles forming the group of at least two aerial vehicles.

22. The method of claim 13 wherein any of the first aerial vehicle to include an intelligent emergency function in which rotors of the first aerial vehicle to shut-down power when a landing command provided by the first computing device fails to reduce altitude of the first aerial vehicle at an expected rate of descent.

23. The method of claim 13:
wherein the first aerial vehicle and the second aerial vehicle also directly communicate with each other in-flight through an ad-hoc local area network formed between the first aerial vehicle and the second aerial vehicle, and
wherein the second aerial vehicle to automatically assume a previous geo-spatial location and a previous altitude of the first aerial vehicle when the first aerial vehicle indicates that a remaining battery power of the first aerial vehicle is below a threshold level based on a take-over function authorized by the first user and communicated to the second user through at least one of the Internet protocol network using the central server and the ad-hoc local area network between the first aerial vehicle and the second aerial vehicle.

24. A system comprising:
a central server;
an Internet protocol network;
a first aerial vehicle communicatively coupled with the central server through the Internet protocol network;
a second aerial vehicle communicatively coupled with the first aerial vehicle when a command is transferred through the central server using the Internet protocol network;
a first computing device of a first user of the first aerial vehicle operatively controlling the first aerial vehicle through the first computing device through the Internet protocol network,
wherein the first computing device to include an undo function to maneuver in flight the first aerial vehicle to a last previously saved geo-spatial location of the first aerial-vehicle based on a last previous location of the first aerial vehicle stored in the central server when the undo function is initiated; and
a second computing device of a second user of the second aerial vehicle operatively controlling the second aerial vehicle through the second computing device through the Internet protocol network, and
wherein at least one of the first computing device of the first user and the second computing device of the second user to communicate a coordination command to the first aerial vehicle through the central server,
a communication logic block to communicate a current geo-spatial location and an altitude data of the first aerial vehicle to the central server when the first aerial vehicle is hovering at the current geo-spatial location for at least a threshold amount of time,
wherein the first user and the second user are communicatively coupled to each other through a neighborhood social network, in which the first user is connected to the second user in the neighborhood social network prior to the second computing device of the second user communicating the coordination command to the first aerial vehicle through the central server,
wherein at least one of the first computing device and the second computing device is at least one of a mobile device and a desktop computer, and
wherein the threshold amount of time is at least approximately two seconds of time.

25. The system of claim 24:
wherein the second computing device of the second user to communicate the coordination command to the first aerial vehicle through the central server to be a set of instructions that instruct any of the first computing device, the first aerial vehicle, and the second aerial vehicle that the second aerial vehicle to position itself in an adjacent manner in relation to the first aerial vehicle at a threshold distance away that is at least one of to a left to the first aerial vehicle, to a right of the first aerial vehicle, to a front of the first aerial vehicle, and to a rear of the first aerial vehicle.

26. The system of claim 25:
wherein at least one of the first computing device and the second computing device is at least one of a mobile device and a desktop computer,
wherein any of the first aerial vehicle to include an intelligent emergency function in which rotors of the first aerial vehicle to shut-down power when a landing command provided by the first computing device fails to reduce altitude of the first aerial vehicle at an expected rate of descent,
a peer-to-peer logic block to enable the first aerial vehicle and the second aerial vehicle to also directly communicate with each other in-flight through an ad-hoc local area network formed between the first aerial vehicle and the second aerial vehicle, and
an assumption logic block to automatically assume a previous geo-spatial location and a previous altitude of the first aerial vehicle when the first aerial vehicle indicates that a remaining battery power of the first aerial vehicle is below a threshold level based on a take-over function authorized by the first user and communicated to the second user through at least one of the Internet protocol network using the central server and the ad-hoc local area network between the first aerial vehicle and the second aerial vehicle.

* * * * *